(12) United States Patent
Zhang et al.

(10) Patent No.: US 11,741,105 B2
(45) Date of Patent: Aug. 29, 2023

(54) INTELLIGENT REMOTE MONITORING METHOD FOR FIRE-FIGHTING

(71) Applicant: Shanghai Rayeye Technology Co., Ltd., Shanghai (CN)

(72) Inventors: Kewen Zhang, Shanghai (CN); Peng Huang, Shanghai (CN)

(73) Assignee: Shanghai Rayeye Technology Co., Ltd., Shanghai (CN)

( * ) Notice: Subject to any disclaimer, the term of this patent is extended or adjusted under 35 U.S.C. 154(b) by 346 days.

(21) Appl. No.: 17/237,129

(22) Filed: Apr. 22, 2021

(65) Prior Publication Data

US 2022/0035818 A1 Feb. 3, 2022

(30) Foreign Application Priority Data

Jul. 28, 2020 (CN) .......................... 202010737554.5

(51) Int. Cl.
*G06F 16/24* (2019.01)
*G06F 16/2455* (2019.01)
*G06F 9/445* (2018.01)
*G06F 9/54* (2006.01)
*G06N 5/022* (2023.01)
*G06N 5/025* (2023.01)
*G08B 17/00* (2006.01)
*G08B 21/18* (2006.01)

(52) U.S. Cl.
CPC .... *G06F 16/24568* (2019.01); *G06F 9/44505* (2013.01); *G06F 9/542* (2013.01); *G06F 9/546* (2013.01); *G06F 16/24565* (2019.01); *G06N 5/022* (2013.01); *G06N 5/025* (2013.01); *G08B 17/00* (2013.01); *G08B 21/187* (2013.01)

(58) Field of Classification Search
CPC ......... G06F 16/24568; G06F 16/24565; G06F 9/44505
See application file for complete search history.

(56) References Cited

U.S. PATENT DOCUMENTS

| 11,375,063 B1* | 6/2022 | Frenkel | H04M 3/5166 |
| 2020/0221548 A1* | 7/2020 | Pan | F21V 23/0471 |

\* cited by examiner

*Primary Examiner* — Loc Tran
(74) *Attorney, Agent, or Firm* — Zhu Lehnhoff LLP

(57) ABSTRACT

Disclosed is an intelligent remote monitoring method for fire-fighting, including: S1, pre-loading a protocol parsing configuration file in JSON format; S2, acquiring fire-fighting status information and operation status information of fire-fighting IoT equipment to obtain a data frame of a binary protocol; S3, parsing the data frame according to the configuration file to obtain a JSON data object, and pushing the parsed data of the fire-fighting IoT equipment to a routing layer through data push technology including kafka technology and storing in a fire-fighting database; S4: presetting different application modules according to different application services, and determining a routing direction of the data of the fire-fighting IoT equipment according to rules including a device type and a device status, and routing the data of the corresponding fire-fighting IoT equipment to the corresponding application module through the routing layer for triggering processing of events including alarms and faults, so as to realize remote monitoring of fire-fighting.

8 Claims, 5 Drawing Sheets

INTELLIGENT REMOTE MONITORING METHOD FOR FIRE-FIGHTING

The present application claims the priority of Chinese Patent Application No. 202010737554.5, filed Jul. 28, 2020, the disclosure of which is hereby incorporated by reference in its entirety.

BACKGROUND OF THE INVENTION

Field of the Invention

The present invention relates to the industries of fire-fighting and insurance, in particular, to an intelligent remote monitoring method for fire-fighting, a system thereof, and an intelligent safety control method for fire-fighting.

Description of the Prior Art

Fire disaster has become the most frequent risk in modern society. For all kinds of fire-fighting systems and equipment in existing buildings, there is currently no complete normalized monitoring system in place. The fire-fighting safety management of buildings is mostly in a passive state, i.e., the assessment and improvement of the fire-fighting safety status of the building are often started after a fire occurs or the building has a large fire hazard. The fire-fighting safety management for buildings lacks a normalized, institutionalized, and standardized working mechanism, and there are still many problems that need to be resolved urgently, e.g., personnel do not have a comprehensive understanding of the status of fire-fighting facilities and equipment in the buildings and cannot identify the overall safety of the buildings and the existing fire hazards; the fire-fighting management personnel, inspection personnel, and maintenance and inspection personnel in a unit do not understand fire-fighting laws, regulations and technical standards, are unfamiliar with the use and operation of automatic fire-fighting facilities and equipment, and have not properly maintained these facilities and equipment; daily fire-fighting safety management work simply relies on inspections to discover hidden fire hazards and equipment abnormalities, which cannot effectively control fire risks and ensure the fire-fighting safety status of the buildings.

In addition, fire-fighting and insurance are gradually formed in the practice of preventing and controlling fire disasters. The two complement each other and have become the two pillars of fire risk management. Currently, the fire-fighting and the insurance are still in two relatively independent industries, and the fire-fighting department's supervision of the fire disaster is mainly based on the administrative management model and will cannot effectively supervise social units to perform their own main responsibility for fire safety. The inspection process in the insurance industry is generally relatively simple, and the fire safety status information of the underwriting company cannot be updated in time, which is basically a business operation model that emphasizes underwriting and light management and does not fully play an important role in disaster prevention and mitigation.

Based on the above reasons, in fire-fighting, there is an urgent need for a monitoring method that can supervise fire-fighting safety in real time. In addition, there is a need for a calculation method that can update and calculate the insurance premium in real time according to the fire-fighting status of the building.

SUMMARY OF THE INVENTION

In order to solve the problems existed in prior art, the present invention provides an intelligent remote monitoring method for fire-fighting and a system thereof.

The present invention further provides an intelligent fire-fighting safety assessment method and a system thereof, and a fire insurance business method and a system thereof based on the intelligent fire-fighting safety assessment.

The technical solution used in the present invention is as follows:

An intelligent remote monitoring method for fire-fighting includes:

S1: pre-loading, by a remote transmission device, a configuration file in JSON format, the configuration file being configured to describe a binary protocol of fire-fighting IoT equipment of a single building or an independent site;

S2: acquiring, by the remote transmission device, fire-fighting status information and operation status information of the fire-protection IoT equipment to obtain a data frame of a binary protocol;

S3: parsing, by a fire-fighting IoT cloud computing center, the data frame according to the configuration file to obtain a JSON object, pushing the parsed data of the fire-fighting IoT equipment to a routing layer of the fire-fighting IoT cloud computing center through data push technology including kafka technology, and storing in a fire-fighting database;

S4: presetting different application modules according to different application services, and determining a routing direction of the data of the fire-fighting IoT equipment according to rules including a device type and a device status, and routing the data of the corresponding fire-fighting IoT equipment to the corresponding application module through the routing layer for triggering processing of events including alarms and faults, so as to realize remote monitoring of fire-fighting.

A safety management and control method based on the above intelligent remote monitoring method for fire-fighting includes steps of:

S1, establishing a management and control server for intelligent safety management and control of fire-fighting, and pre-establishing a multi-level intelligent fire-fighting safety management and control index model for the safety management and control of fire-fighting according to single buildings or independent places based on the nature of the unit in advance and saving the fire-fighting safety management and control index model in the management and control server before the safety management and control of fire-fighting;

S2, the management and control server checking item by item of data collected in real time based on the fire-fighting management and control index model through fire-fighting files of the units and data collected in time by the fire-fighting IoT system in the intelligent remote monitoring method for fire-fighting according to the established fire-fighting safety management and control index model, and managing and controlling each individual item in accordance with management and control standards, which further includes:

S21: pre-loading, by the remote transmission device of the fire-fighting IoT system, a configuration file in JSON format, the configuration file being configured to describe a binary protocol of fire-fighting IoT equipment of a single building or an independent site;

S22: encoding text data to be sent the IoT equipment according to the configuration file when sending the data to the fire-fighting IoT cloud computing center to obtain the data frame of the binary protocol, the text data at least including a data unit identifier such as a processing type identifier of the fire-fighting IoT equipment and the number of information objects and a plurality of information objects of the same type, S23: parsing, by the data frame of the binary protocol, the data frame to obtain the JSON object according to the configuration file, simultaneously obtaining and storing in the database a field current value corresponding to these information objects through a compatible JSON object template, and presetting the JSON object template for each processing type of the fire-fighting IoT equipment for describe the plurality of fields that make up the JSON object template and an arrangement order between the plurality of fields;

S24: obtaining the status data from the JSON object, and putting the information object information where the status data is located into a compatible message queue for post-processing according to the state data;

S25: finding a current value of a corresponding field from the database, and checking the management and control indexes item by item and managing and controlling each individual item according to the management and control standards to make timely adjustments to unsafe indexes according to the preset fire-fighting safety management and control index model.

Further including:

loading a configuration file in JSON format on the fire-fighting IoT cloud computing center, the configuration file being configured to describe a downlink binary protocol of fire-fighting IoT equipment of a single building or an independent site;

pre-reading the current data of all fire-fighting IoT equipment of the single building or the independent site, and encoding text data to be sent the IoT equipment according to the configuration file to obtain the data frame of the binary protocol, the text data at least including the read processing type identifier of the fire-fighting IoT equipment and an information body, the information body including at least one read current data of the fire-fighting IoT equipment;

receiving the data frame of the binary protocol and decoding the data frame according to the configuration file, by the single building and the independent site, to obtain the text data to obtain the read processing type identifier of the fire-fighting IoT equipment and an information body information and time;

encoding text data to be sent the IoT equipment according to the configuration file to obtain the data frame of the binary protocol for the corresponding one or more fire-fighting IoT equipment and the current data and time by the single building or independent site, and then performing corresponding processing.

Further, the encoding text data to be sent the IoT equipment according to the configuration file to obtain the data frame of the binary protocol includes:

encoding the text data to be sent the IoT equipment to obtain a data payload;

encrypting the data payload according to an encryption and decryption method in the configuration file;

generating a data length and a data header for the encrypted data payload according to a data frame template in the configuration file; generating a verification code for the encrypted data payload according to a data verification method in the configuration file;

combining the encrypted data payload, the encrypted data length, the encrypted data header and the verification code to obtain the data frame of the binary protocol.

A calculation method of fire insurance premium rate based on the above intelligent remote monitoring method for fire-fighting includes steps of:

S1, establishing a management and control server for intelligent safety management and control of fire-fighting, and pre-establishing a multi-level intelligent fire-fighting safety management and control index model for the safety management and control of fire-fighting according to single buildings or independent places based on the nature of the unit in advance before the safety management and control of fire-fighting;

S2, the management and control server checking item by item of data collected in real time based on the fire-fighting safety management and control index model through fire-fighting files of the units and data collected in time by the fire-fighting IoT system in the intelligent remote monitoring method for fire-fighting according to the established fire-fighting safety management and control index model, and managing and controlling each individual item in accordance with management and control standards;

S3, by the management and control server, determining a fire safety level of the controlled unit through a series of processes of weight determination and synthesis calculation, issuing corresponding fire-fighting safety assessment management and control reports and rectification suggestions, and outputting the results to an insurance management platform of an insurance company;

S4, by the insurance management platform, grasping an actual fire safety situation of the underwriting unit, calculating a reasonable rate floating factor, and giving underwriting recommendations according to the fire-fighting safety assessment results.

Further, in the step S2:

S21: pre-loading, by the remote transmission device of the fire-fighting IoT system, a configuration file in JSON format, the configuration file being configured to describe a binary protocol of fire-fighting IoT equipment of a single building or an independent site, the fire-fighting IoT equipment including a building fire-fighting facility and/or equipment;

S22: encoding text data to be sent the IoT equipment according to the configuration file when sending the data to the fire-fighting IoT cloud computing center to obtain the data frame of the binary protocol, the text data including at least a data unit identifier such as a processing type identifier of the fire-fighting IoT equipment and the number of information objects and a plurality of information objects of the same type, each of the information objects containing an information body and a processing time point, the data frame simultaneously transmitting current data of a plurality of building fire-fighting facilities and/or equipment comprising a status/an analog quantity/a configuration/a corresponding user operation; when the processing type of the fire-fighting IoT equipment is status upload, the information body of each of the information objects containing at least one status data including a to delay, a feedback, a start-up, a supervision, a shielding, a fault, and a fire alarm where the fire-fighting IoT equipment is located;

S23: parsing, by the data frame of the binary protocol, the data frame to obtain the JSON object according to the configuration file, simultaneously obtaining and storing in the database a field current value corresponding to these information objects through a compatible JSON object template, and presetting the JSON object template for each processing type of the fire-fighting IoT equipment for describe the plurality of fields that make up the JSON object template and an arrangement order between the plurality of fields;

S24: obtaining the status data from the JSON object, and putting the information object information where the status data is located into a compatible MQ message queue for post-processing according to the state data;

S25: finding a current value of a corresponding field from the database, and checking the assessment indexes item by item according to the preset assessment index model and assessing each individual item in accordance to the assessment standards.

Further, in the step S2, the process of collecting information in time by the fire-fighting IoT system includes steps of:

S21, uploading fire-fighting data collected by an IoT sensing equipment to a IoT user information device;

S22, transmitting the collected fire protection data, by the IoT user information device, to the fire-fighting IoT cloud computing center through an optical fiber cable network, an IoT private network or a mobile network;

S23, analyzing and processing the collected fire-fighting data, by the fire-fighting IoT cloud computing center, to send the obtained results to a system operation platform, an owner application platform, a property application platform and a maintenance application platform for data application;

S24, processing information and outputting results, by the system operation platform, to provide background support services for the owner application platform, the property application platform and the maintenance application platform, and exchange information with a fire-fighting data exchange application center;

S25, receiving and calling information of the owner application platform or the system operation platform, by the fire-fighting data exchange application center, for centralized analysis and application of the fire-fighting data, and pushing relevant fire-fighting information to the owner application platform or the system operation platform.

Further, the step S3 includes steps of:

S31, determining weight coefficients of the controlled unit;

S32, determining scores of each index according to the fire-fighting data provided by the fire-fighting data exchange application center based on the fire-fighting safety management and control index module to calculate a scoring rate of the controlled unit;

S33, calculating final scores of the controlled object;

S34, obtaining a fire-fighting safety level of the controlled object in accordance to grading standards according to the final scores of the controlled object, and proposing improvement suggestions;

S35, listing all the problematic items according to the checking results, providing provisions of the fire-fighting regulations and technical standards, and providing rectification methods and measures.

Further, the step S4 includes steps of:

S41, undertaking the fire risk of the above buildings or sites if the intelligent fire safety assessment of the building or independent site is in a first level, which indicates that the insured company has a low fire risk and the state of fire-fighting facilities and safety management are relatively good, and determining a basic rate according to industry data, wherein when the intelligent security assessment of the insured company is lower than the first level, the insurance company has the right to terminate the insurance contract;

S42, refusing to insure the above building or independent site if the intelligent fire-fighting safety assessment of the building or independent site is in the second level, which indicates that the insured enterprise has a greater fire risk, the insured company violates the fire-fighting laws and regulations and fire technical standards, the fire risk exceeds an expected tolerable level, and the fire-fighting facilities and equipment and the level of safety management are poor; following the previous step after the safety assessment score reaches the first level if the insured company implements the rectification of company fire based on the corrective measures proposed by the functional assessment;

S43, before the start of the next insurance implementation year, analyzing the fire risk level and development trend of the building or independent site in the previous implementation year based on the fire-fighting safety assessment data of the underwriting unit to determine the fire insurance premium rate for the next year and implement a floating rate, so as to determine the fire insurance cost based on the actual situation of the underwriting unit.

A safety management and control method based on the above intelligent remote monitoring method for fire-fighting includes a fire-fighting IoT system, a fire-fighting data exchange application center, an artificial intelligent data analysis model and a fire-fighting safety management and control index system, wherein the fire-fighting data exchange application center receives and calls the fire-fighting data collected in time by the fire-fighting IoT system; the artificial intelligent data analysis model checks management and control indexes item by item through the unit fire-fighting files and the fire-fighting data called by the fire-fighting data exchange application center according to the fire-fighting safety management and control index system, and assesses each individual item in accordance to the assessment standards, and determines the fire-fighting safety level of the controlled unit through a series of processes of weight determination and combined calculations while giving the corresponding fire-fighting safety assessment reports and rectification suggestions.

Compared with the conventional art, the present invention has the following beneficial effects:

The intelligent fire-fighting safety management and control of the present invention based on the fire IoT system is effective in real time, the management and control result is more reliable, and the information and data may be traced back. The intelligent fire-fighting safety management and control is integrated with the fire insurance, and a bridge is built between enterprise fire-fighting investment and economic benefit output, so that the enthusiasm of enterprises is fully mobilized to strengthen the construction and management of fire-fighting safety through actual benefits, and enterprises may be indeed helped to implement the main responsibility of fire-fighting safety; the working mechanism of intelligent fire-fighting safety management and control combined with fire insurance may break through the barriers between the two industries of fire-fighting and insurance, establish a fire risk management and control work model for the entire life cycle of the insurance industry before, during and after the event, really play an important role in fire insurance and disaster prevention and loss reduction, and also lay the foundation for the vigorous development of the insurance industry.

Certainly, any one product for implementing the present invention is unnecessary to achieve all the above advantages at the same time.

DESCRIPTION OF THE PREFERRED EMBODIMENTS

To make the purpose, technical solutions, and advantages of the present invention clearer, the implementation manners of the present invention are described below in detail with reference to the accompanying drawings.

The interactive working mechanism combining an intelligent fire-fighting safety management and control and a fire insurance consists of two parts: first, intelligent fire-fighting safety management and control of buildings and sites, with real-time, accurate and intelligent characteristics, may realize all-weather and all-time fire risk analysis and fire-fighting safety management and control; second, the insurance company proposes underwriting recommendations and determines the insurance premium rate based on the fire insurance underwriting model based on the management and control results of a unit.

Embodiment One

Figure 1:
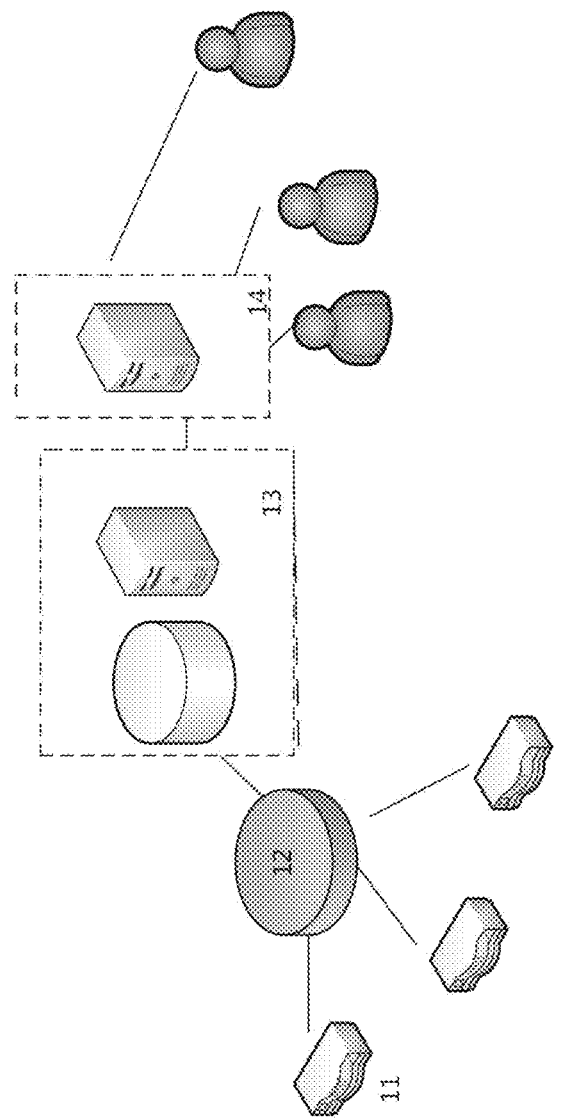
FIG. 1 is a system diagram of the principle of an intelligent remote monitoring of fire-fighting based on IoT.

With reference to FIG. 1, an intelligent remote monitoring system of fire-fighting is shown, wherein by a remote transmission device 11 of fire-fighting IoT, operation data of fire-fighting facilities are dynamically upload to a data center 13 of Urban IoT Fire-Fighting Remote Monitoring System through a network 12 or dedicated lines in real time or event-triggered upload to realize online real-time generation of unit fire-fighting safety level assessment and automatically form data to give the research and judgment results to the corresponding object (such as the designated person); subsequently, all the data may be summarized to a cloud intelligent fire-fighting supervision cloud platform 14, so that the hidden dangers of building fire-fighting are clear at a glance, and APP, platform, SMS, voice call, manual customer service and other methods may be used to achieve real-time acquisition of all fire-fighting facility operation information and maintenance unit daily work information. The comprehensive and dynamic supervision and management of the daily operation status of the fire-fighting IoT equipment and facilities of social units may also be realized while realizing the networking of fire-fighting facilities. The centralized monitoring of the urban IoT fire-fighting remote monitoring system realizes the centralized processing of fire alarms in several buildings. Unified management, unified dispatch, unified emergency treatment of hidden dangers are realized to reduce personnel costs, and improve the level of fire-fighting safety management. The data center 13 and the cloud intelligent fire-fighting supervision cloud platform 14 may theoretically be on a large platform, for example, the fire-fighting IoT cloud computing center as shown in FIG. 2.

Figure 2:
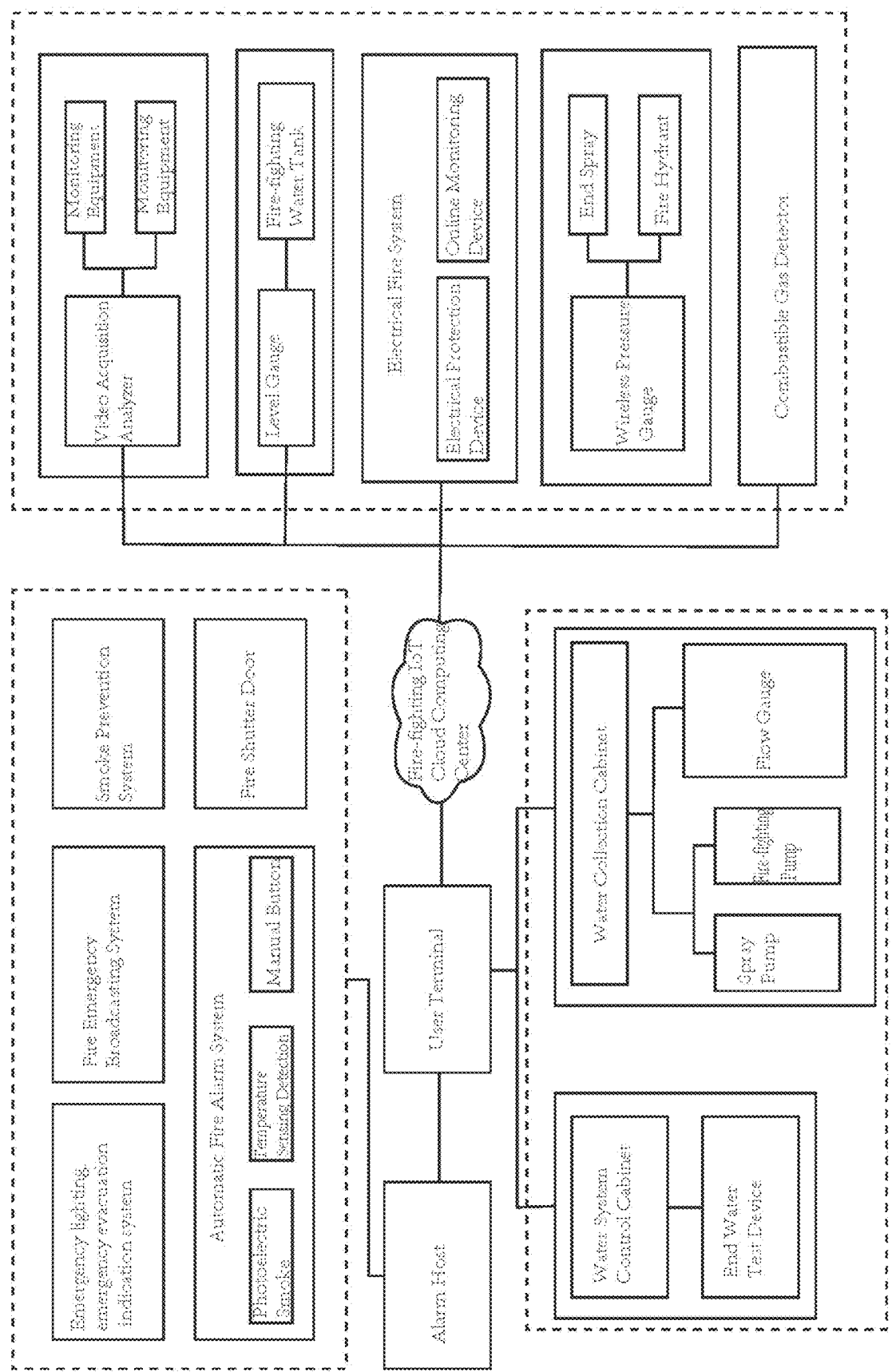
FIG. 2 is a schematic diagram of a collection terminal of an intelligent remote monitoring system of fire-fighting based on IoT.

With reference to FIG. 2, a diagram of an example of a fire-fighting IoT transmission system is shown. The remote transmission equipment 11 obtains fire-fighting status information and operation status information of the fire-fighting IoT equipment from the collection equipment terminal, wherein the fire-fighting status information includes one or any of the liquid level height, combustible gas concentration, water system status information, automatic fire alarm system status information, smoke prevention and exhaust system status information, and temperature and power distribution room status information, so as to provide data basis for subsequent processing of the fire-fighting data; then, the fire-fighting status information and the operation status information of the fire-fighting IoT equipment are analyzed and processed to obtain the analysis results, and the analysis results are fed back to a mobile terminal equipment; and then, an early warning mode is determined according to the analysis results. Determining an early warning mode according to the analysis results reduces labor costs while ensuring fire-fighting safety, and realizes a mobile fire-fighting supervision cloud platform 14, so that only a mobile device such as a mobile phone, computer, tablet, etc. may be used to monitor building fire alarms and malfunctions at all times. In the follow-up, it will be mentioned that the combination of the analysis results and the insurance system constitutes another implementation method of our company.

With reference to FIG. 2, a schematic diagram of the architecture for fire-fighting data collection and processing is shown, wherein the server terminal is the fire-fighting IoT cloud computing center, and the data collected by collection terminal includes data monitored by each fire-fighting IoT equipment, such as level gauges, fire water tanks, electrical protection devices in electrical fire systems, wireless pressure gauges, end spray, fire hydrants, combustible gas detectors, water collection cabinets, water system control cabinets, automatic fire alarm system, etc.; specifically, the parsed video data obtained by sending the video recording collected by the monitoring equipment the video analyzer for processing, the pressure value monitored by the wireless pressure gauge connected to the end spray and the fire hydrant, and the combustible gas concentration data monitored by the combustible gas detector may all be uploaded to the computing center of the cloud fire-fighting IoT platform, so that the computing center may process the received monitoring data. The water collection cabinet needs to obtain monitoring data (pressure data and flow data) from wired pressure gauges and flow meters, and the data obtained by the water system control cabinet connected to the terminal water test device is first transmitted to the user terminal and then uploaded to the cloud fire-fighting IoT platform by the user terminal. It is to be noted that the user terminal may also obtain the data of the fireproof rolling door system, smoke prevention and smoke exhaust system, emergency evacuation indication system, etc. connected to the alarm host, as well as the data of the automatic fire alarm system composed of photoelectric smoke, temperature detection, and manual alarm buttons, and transmits the above data obtained to the cloud fire-fighting IoT platform for screening and processing the uploaded data. In this way, it is convenient for the cloud fire-fighting IoT platform to process the data and present the data to users in a unified format to form a complete fire-fighting IoT system and realize urban intelligent fire-fighting.

Figure 5:
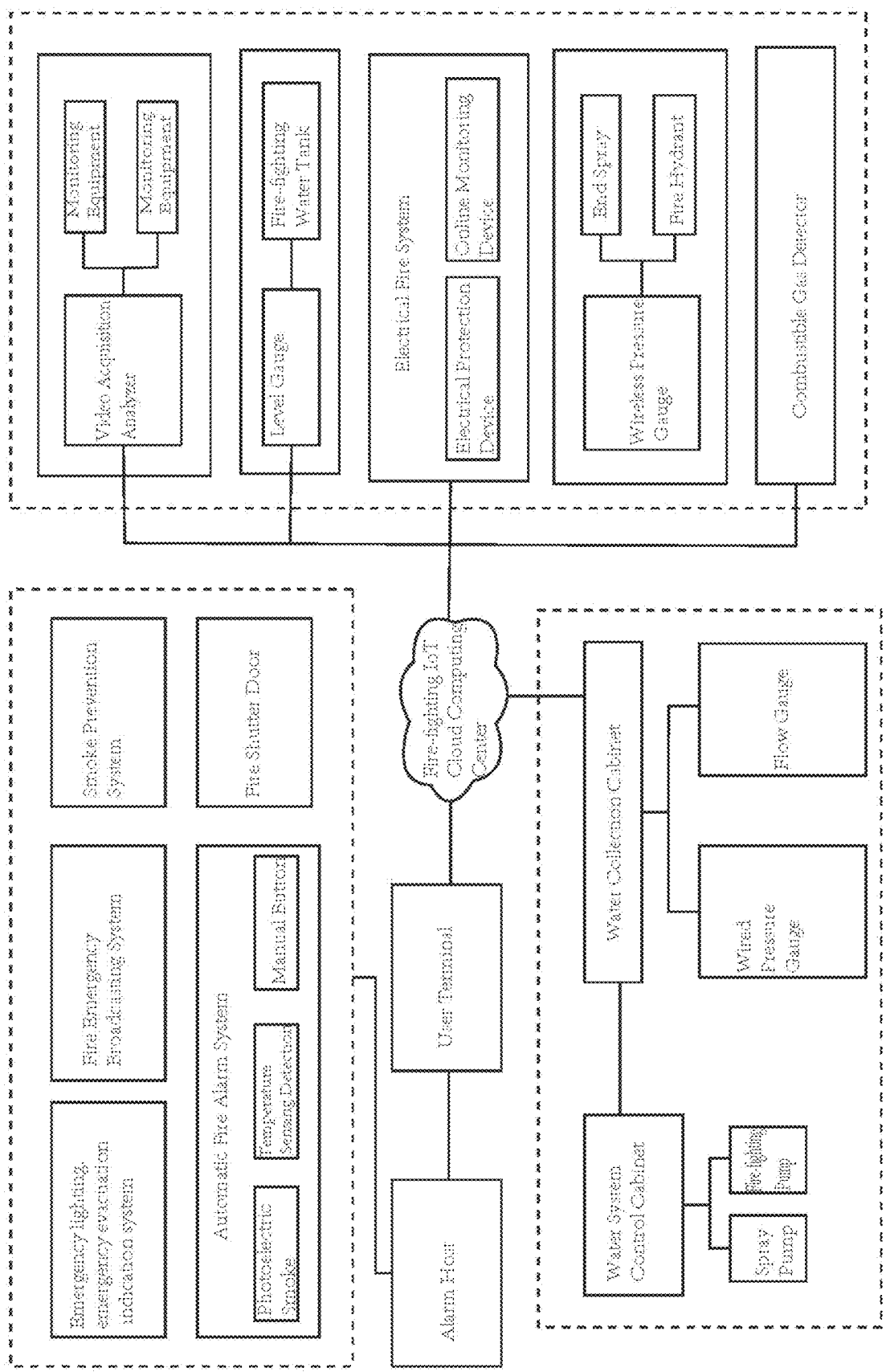
FIG. 5 is a schematic diagram of a collection terminal of another intelligent remote monitoring system of fire-fighting based on IoT.

Further, as shown in FIG. 5, for the water collection cabinet, the water system control cabinet may also be used as our actual collection terminal; after collection, the water collection cabinet is used to obtain the data collected on the water system control cabinet, and then the data is sent directly to the fire-fighting IoT cloud computing center through the water collection cabinet.

However, when collecting data for urban intelligent firefighting control, it is found that there are so many products from various manufacturers that it is impossible to transmit all the data to the platform for unified decoding. To this end, our company sets up a fire-fighting IoT remote transmission device 11 on the data channel collected by the collection terminal. The transmission device 11 may be improved on the structure of the existing remote transmission device, or a transmission device 11 may be newly developed, which generally includes an interface portion connected to the collection terminal, a processor portion, and an interface portion connected to the upper computer (such as the fire-fighting supervision cloud platform 14). The collection terminal connection mainly includes collection equipment or collection systems such as the level meter, the fire water tank, the electrical protection device in the electrical fire system, the wireless pressure gauge, the end spray, the fire hydrant, the combustible gas detector, the water collection cabinet, the water system control cabinet, and the automatic fire alarm system. The processor portion mainly encodes the data collected by these collection terminals in JSON format according to a preset format, so as to obtain the data frame of the binary protocol, and sends the data frame to the firefighting IoT cloud computing center; when the data is received, the data frame of the binary protocol sent by the cloud computing center is received, and the data frame is encoded according to the configuration file to obtain the text data, which may instruct the corresponding equipment, such as pressure gauge, fire-fighting IoT equipment, etc., to perform corresponding operations.

The present invention provides a principle method of an intelligent remote monitoring for fire-fighting, which includes:

a configuration step: a remote transmission device preloads a configuration file in JSON format, the configuration file being configured to describe a binary protocol of fire-fighting IoT equipment of a single building or an independent site;

an encoding step: the remote transmission device acquires fire-fighting status information and operation status information of the fire-fighting IoT equipment to encode the text data to be sent to the fire-fighting cloud computing center, so as to obtain a data frame of a binary protocol;

a parsing step: the fire-fighting IoT cloud computing center parses the data frame according to the configuration file to obtain a JSON object, pushes the parsed data of the fire-fighting IoT equipment to a routing layer of the fire-fighting IoT cloud computing center through data push technology including kafka technology, and stores in a fire-fighting database;

a routing step: different application modules are preset according to different application services, and a routing direction of the data of the fire-fighting IoT equipment is determined according to rules including a device type and a device status, and the data of the corresponding fire-fighting IoT equipment is routed to the corresponding application module through the routing layer;

an event processing step: event trigger processing including alarms and faults is performed to achieve remote fire-fighting monitoring.

The encoding step and the decoding steps mainly realize that a plurality of different collection terminals may be uploaded to our platform, and our platform may perform parsing with a unified data format, which has strong versatility and strong expansion. There may be multiple implementation schemes for the above. In the present invention, JSON technology is used to make a secondary transformation in the system.

(1) The Encoding Step and the Decoding Step

Firstly, a possible implementation solution is introduced.

The technical aspects that this process may involve are introduced first. The binary protocol is actually a stream of bytes, usually including a header and a body. The length of the header is fixed, including the length of the body, so that a complete binary data may be parsed from the data stream. Table 1 is a typical binary protocol:

TABLE 1

| Header | Length | Data | CRC |
| --- | --- | --- | --- |
| 1 Byte | 2 Byte | Length Byte | 2 Byte |

Header is used to identify the start of the protocol, and Length is the length of the body of Data. For ensuring data integrity, the corresponding check code (CRC) will be added, and a part of Data will be encrypted. Although data transmission based on binary protocol reduces redundant data, the readability of binary protocol data is poor.

Text data is well known as text protocol data. The text protocol is generally data composed of a string of ACSII characters. These characters include numbers, uppercase and lowercase letters, percent signs, carriage returns (\r), line feeds (\n), and spaces. The purpose of the text protocol is to make it easier for people to understand and read. When the developers are debugging, they may quickly and accurately see what happened at that time and solve the problem better. However, in order to facilitate the analysis, the text protocol has to be added with some redundant characters to separate commands, which reduces the transmission efficiency of the text protocol data. Therefore, in the present embodiment, JSON (JavaScript Object Notation) is used in advance to describe the binary protocol customized by the IoT equipment manufacturer (or the applicant), and the configuration file is first loaded into the memory when the system starts; in the subsequent data transmission process, the binary protocol data with poor readability is analyzed according to the configuration file, and finally decoded into text data with good readability; the encoding process encodes the file data into binary protocol data for transmission according to the configuration file. The above configuration files include data verification methods, data frame templates, and encryption and decryption methods, wherein the data frame template is used to describe the plurality of fields constituting the data frame and the arrangement order between the plurality of fields. Therefore, the present embodiment may greatly reduce the development time of protocol access while ensuring data transmission efficiency, and has good versatility.

JSON is a lightweight data exchange format that uses a text format completely independent of programming languages to store and represent data. JSON has a concise and clear hierarchical structure, which is easy for humans to read and write, and is also easy for machines to parse and generate, thereby becoming an ideal data exchange language.

As mentioned above, in the present embodiment, the configuration file is written in JSON format, based on which preferably the present embodiment adopts the responsibility chain mode to implement the codec conversion process between binary protocol data and the text protocol data. The above responsibility chain mode is an object behavior model. According to the principle of synthetic reuse, association is used to replace class inheritance, and the object behavior model may be said to be a good behavior model. The responsibility chain design pattern is a pattern that separates the sender of the request from the request processor without requiring the details of request processing, as long as the request is sent along the path, so that the decoupling of request sender and request processor is achieved.

According to the codec process of the responsibility chain mode, the foregoing decoding of the data frame according to the configuration file to obtain text data includes the following steps:

the data frame is checked according to the check code in the data frame and the data check mode in the configuration file;

if the verification is passed, the data frame is split into a data header, a data length, and a data payload according to the data frame template in the configuration file; the data payload is decrypted according to the encryption and decryption method in the configuration file;

the decrypted data payload is decoded to obtain the text data.

Correspondingly, the encoding text data to be sent the IoT equipment according to the configuration file to obtain the data frame of the binary protocol includes the following steps:

the text data to be sent the IoT equipment is encoded to obtain a data payload; the data payload is encrypted according to the encryption and decryption method in the configuration file;

a data length and a data header are generated for the encrypted data payload according to a data frame template in the configuration file; a verification code is generated for the encrypted data payload according to a data verification method in the configuration file; the encrypted data payload, the encrypted data length, the encrypted data header and the verification code are combined to obtain the data frame of the binary protocol. It can be seen that the method only needs to define a configuration file in JSON format in advance, and may decode and encode the binary data without modifying the code, which facilitates accessing various customized IoT equipment protocols, and improving the efficiency of data transmission.

However, if the solution should be used for intelligent fire-fighting safety assessment, there are the following problems: first of all, there are a lot of message facilities or equipment in a single building or independent site, such as fire-fighting water supply and fire hydrant systems, sprinkler systems, smoke prevention and exhaust systems, automatic fire alarm systems, electrical fire monitoring systems and combustible gas detection and alarm systems, which include a large number of various fire-fighting facilities or equipment.

In the present invention, the data communication from a single building or an independent site to the fire-fighting IoT cloud computing center is called an upload process. The remote transmission device or network equipment from the fire-fighting IoT cloud computing center to the single building or the independent site is called a download process. Generally speaking, the upload process is necessary, and the download process may achieve the effect of reading the current data, which is optional. Taking the upload process as an example, if the data is sent one by one according to the equipment such as smoke detectors, temperature detectors, etc., the number of data packets that may be transmitted on the entire network is very large. To this end, in the present invention, the processing types of the fire-fighting IoT equipment are preliminarily classified; for example, the classification includes uploading the system status of the building fire-fighting facilities, uploading the operation status of the building fire-fighting facilities, uploading simulation values of the building fire-fighting equipment components, uploading the building fire-fighting equipment operation information records, uploading the configuration of the building fire-fighting facility system, uploading the configuration of building fire-fighting facility component, and uploading the operation status of the user information transmission device.

For each type, the format of configuration file is preset. As shown in Table 2.

TABLE 2

| | | Data unit identifier | | | | | | | | | |
|---|---|---|---|---|---|---|---|---|---|---|---|
| | | Number of | | | Information object 1 | | | | | | |
| | Type | information | | | | Status occurrence time | | | | | |
| | flag 1B | objects 1B | | Information body | | Second 1B | Minute 1B | Hour 1B | Date 1B | Month 1B | Year 1B | Information ... object n |
| Uploading status of the building fire-fighting facility system | 01 | n (≤102) | System type XX | System address XX | System status | XX | XX | XX | XX | XX | XX | ... (As previously stated) |

Details of the System Status in Table 2 are Shown in Table 2-1:

TABLE 2-1

| | | | System status 2B | | | | |
|---|---|---|---|---|---|---|---|
| | | | L | | | | |
| bit 7 | Bit 6 | Bit 5 | Bit 4 | Bit 3 | Bit 2 | Bit 1 | Bit 0 |

TABLE 2-1-continued

| \multicolumn{16}{c}{System status 2B} |
|---|---|---|---|---|---|---|---|---|---|---|---|---|---|---|---|
| 0- | N/A | 0- | N/A | 0- | Stop | 0- | N/A | 0- | N/A | 0- | N/A | 0- | N/A | 0- | Normal |
| 1- | Time delay | 1- | Feedback | 1- | Start | 1- | Supervision | 1- | Shield | 1- | Fault | 1- | Fire alarm | 1- | Test running |

| \multicolumn{13}{c}{H} |
|---|---|---|---|---|---|---|---|---|---|---|---|---|
| Bit 15 | Bit 14 | | Bit 13 | | Bit 12 | | Bit 11 | Bit 10 | | Bit9 | | Bit8 |
| 0- reserved | 0- reserved | 0- | Normal | 0- | N/A | 0- | Auto | Auto | 0- | Normal bus | 0- | Normal backup power | 0- | Normal power supply |
| | | 1- | Reset | 1- | Configuration change | 1- | Manual | Manual | 1- | Faulty bus | 1- | Faulty backup power | 1- | Faulty power supply |

The type flag is 1B, indicating uploading the status of the building fire-fighting facility system. An information object represents a building fire-fighting facility system. Each information object includes the information body and the time when the status occurred. The format included in the information body is the system status, which may be various states. The states are such as delay, feedback, start, supervision, shielding, fault, and fire alarm which are respectively corresponding from bit 7 to bit 0 and are provided for indicating the status is normal or not. Each building fire-fighting facility system places the current data value in accordance with the format of the preset information body. A data packet may be represented by the current system status of the building fire-fighting facility system whose type flag is 1B, and the corresponding current status value is placed in a preset binary format. In this way, during transmission, multiple data packets may be transmitted, and may be parsed to obtain the corresponding current status values, normal or not, and reading time only by parsing in the format of the information body at the preset position.

For example, a single building or independent site has a remote transmission device, and there are N systems connected to the remote transmission device; N information object representatives may be extended in a data packet, which represents the current state value of the corresponding building fire-fighting system, the transmission efficiency is high while having multiple extensions; if one wants to transmit one more building fire-fighting system, one more information object representative should be added, which is very convenient, efficient and accurate.

As shown in Table 3, a configured binary table corresponding to uploading operation status of the building fire-fighting facility components is shown.

TABLE 3

| \multicolumn{2}{c}{Data unit identifier} | | | | | | | |
|---|---|---|---|---|---|---|---|---|
| Type flag | Number of information objects | \multicolumn{7}{c}{Information object 1} |
| 1B | 1B | \multicolumn{7}{c}{Information body} |
| Uploading status of the building fire-fighting facility system | 02 | n (≤22) | System type | System address | Component Type | Component Address | System status | Component Status |
| | | | | | | Location Number / Region Number | | |
| | | | 1B | 1B | 1B | 2B / 2B | | 31B |
| | | | XX | XX | XX | L H L H / XX XX XX XX | | String (GB18030 encoding) |
| | | \multicolumn{7}{c}{Information object 1 Status occurrence time} |
| | | | Second 1B | Minute 1B | Hour 1B | Date 1B | Month 1B | Year 1B | Information ... object n |
| | | Uploading status of the building fire-fighting facility system | XX | XX | XX | XX | XX | XX | ... (As previously stated) |

Details of the Component Status in Table 3 are Shown in Table 3-1:

TABLE 3-1

System status 2B

| | | | | | L | | | | | | | | | | |
|---|---|---|---|---|---|---|---|---|---|---|---|---|---|---|---|
| bit 7 | | Bit 6 | | Bit 5 | | Bit 4 | | Bit 3 | | Bit 2 | | Bit 1 | | Bit 0 | |
| 0- | N/A | 0- | N/A | 0- | Stop | 0- | N/A | 0- | N/A | 0- | N/A | 0- | N/A | 0- | Normal |
| 1- | Time delay | 1- | Feedback | 1- | Start | 1- | Supervision | 1- | Shield | 1- | Fault | 1- | Fire alarm | 1- | Test running |

| | | | | | H | | | | | | | | | | |
|---|---|---|---|---|---|---|---|---|---|---|---|---|---|---|---|
| | | Bit 15 | | Bit 14 | | Bit 13 | | Bit 12 | | Bit 11 | | Bit 10 | | Bit 9 | Bit 8 |
| | | 0- reserved | | 0- reserved | | 0- reserved | | 0- reserved | | 0- reserved | | 0- reserved | | 0- reserved | 0- Normal power supply |
| | | | | | | | | | | | | | | | 1- Faulty power supply |

The encoding and decoding further includes:

SA1, the remote transmission device of the fire-fighting IoT system pre-loads a configuration file in JSON format, the configuration file being configured to describe a binary protocol of fire-fighting IoT equipment of a single building or an independent site, the fire-fighting IoT equipment including a building fire-fighting facility and/or equipment;

SA2: the text data to be sent the IoT equipment is encoded according to the configuration file when the data is sent to the fire-fighting IoT cloud computing center to obtain the data frame of the binary protocol, the text data including at least a data unit identifier such as a processing type identifier of the fire-fighting IoT equipment and the number of information objects and a plurality of information objects of the same type, each of the information objects containing an information body and a processing time point, the data frame simultaneously transmitting current data of a plurality of building fire-fighting facilities and/or equipment comprising a status/an analog quantity/a configuration/a corresponding user operation; when the processing type of the fire-fighting IoT equipment is status upload, the information body of each of the information objects containing at least one status data including a delay, a feedback, a start-up, a supervision, a shielding, a fault, and a fire alarm where the fire-fighting IoT equipment is located;

SA3, the data frame of the binary protocol parses the data frame to obtain the JSON object according to the configuration file, simultaneously obtains and stores in the database a field current value corresponding to these information objects through a compatible JSON object template, and presets the JSON object template for each processing type of the fire-fighting IoT equipment for describe the plurality of fields that make up the JSON object template and an arrangement order between the plurality of fields;

```
{
"devId": "4b040000000007128000",
"hid": "4b0400000000",
"devStatus": [4],
"devLog": {
"devType": 0,
```

-continued

```
"hostnum": 0,
"devnumber": "0-128-4615",
"sysid": 1,
"loopnum": 128,
"spointnum": 4615,
"order": 2,
"typeFlag": 2
},
"recTime": "20200410184215",
"source": 11,
"type": 0,
"sendTime": "20473614120320"
}
```

The encoding and decoding process includes the following four processing steps: message verification, template analysis, data encryption and decryption, message analysis. Specifically, the decoding process converts the binary protocol into data in text format with good readability, and the encoding process converts the file format data into binary data for network transmission. Due to the wide variety of IoT terminals and limited resources, various manufacturers often have custom binary format data protocols, which need to be hard-decoded when accessing the cloud platform, and the code versatility is poor. The method provided by the present embodiment only needs to define a configuration file in JSON format in advance, and may decode and encode the binary data without modifying the code, which facilitates accessing various customized IoT protocols, and improving the efficiency of data transmission.

SA4, the status data is obtained from the JSON object, and the information object information where the status data is located is put into a compatible MQ message queue for post-processing according to the state data.

SA5 (the processing refers to evaluation processing, which is one of the event processing), a current value of a corresponding field is found from the database, and the assessment indexes are checked item by item according to the preset assessment index model and each individual item is assessed in accordance to the assessment standards.

When the platform perform parsing, there are many parsing methods used; in the present embodiment, an example of one of the parsing methods is also given, and the above is only an example and is not intended to limit the present invention.

SB1, a preset tool base corresponding to a data parsing protocol is pre-established for the data parsing protocol parsing the fire-fighting data transmitted in a fire-fighting IoT, and a preset method applied in the data parsing protocol is stored in the preset tool base.

Specifically, in the present embodiment, in the data parsing protocol of the fire-fighting data, some preset methods are generally used, and the data parsing process is a process of using multiple different or the same preset methods to analyze the fire-fighting data by calling the preset methods one by one according to the data parsing logic in the data parsing protocol. A preset tool base is established in the server in advance, and some predetermined preset methods are written into the preset tool base. In the follow-up, through the visual configuration platform, selection of a specific preset method is only required to splice the fire-fighting data into a JSON object. At the same time, the methods in the preset tool base are not static; preset methods may be added, modified and deleted in the preset tool base according to specific needs.

For example, the preset methods including data acquisition, data splicing, array conversion, data comparison, cyclic processing of data in the array, and data splicing are set in the preset tool base in advance. For the data structure in the data parsing protocol, different preset methods are selected for data processing.

SB2, a visual configuration platform is established for entering the data parsing protocol, such as a data parameter name corresponding to a data parameter in the data parsing protocol are received, the preset method required for the data parameter is parsed out and protocol parsing information such as a method parameter corresponding to the preset method are invoked through the visual configuration platform, and the protocol parsing information are sent to a background server.

Specifically, in the present embodiment, a visual configuration platform is developed, and the controls for entering the data parsing protocol, including text boxes, drop-down boxes, etc., are set for entering the data parsing protocol on the visual configuration platform. For each data parameter in the fire-fighting data, such as time, the data parameter name corresponding to the data parameter is entered, which may be a customized name, as long as the meaning of data parameters may be clearly expressed and the names of other data parameters are not repeated.

After the name of the data parameter is entered, it is necessary to enter the preset method corresponding to the parsed data parameter, and invoke the method parameter corresponding to the preset method. Taking "time" as an example, time is entered as the data parameter name, Get-Time method preset in the above preset tool base is entered as the preset method, and the method parameters of GetTime are set according to the parameter types and the number of parameters set in the GetTime method. For example, the parameter is the start bit corresponding to the data used to express the time in the fire-fighting data, wherein if the start bit of the data representing the time is 13 in the fire-fighting data, the method parameter corresponding to the GetTime method is invoked and 13 is written directly.

The form of the above visual configuration platform is not limited in the present invention, which may be an APP, a website, or a specific module on a website, or Wechat applets developed on platforms such as Wechat, public accounts, etc. that may be applied to the visual configuration platform.

The control for inputting the preset method on the visual configuration platform may be set to include a drop-down box and a fuzzy search method to display the name of the preset method; the name of the preset method displayed on the visual configuration platform is synchronized with the preset method in the preset tool base. In order to achieve synchronization with the preset tool base, a list of preset methods of the preset tool base may be maintained in the database, wherein when the interface is clicked for entering the data parsing protocol on the visual configuration platform, the list of preset methods is automatically loaded into the memory and bound with the controls for entering the preset methods.

SB3, the background server splices the data parsing protocol into to one JSON object, with the data parameter name as an object name of the data parameter, such as the preset method required for parsing the data parameter and the protocol parsing information such as the method parameter corresponding to the preset method are invoked as an object value of the data parameter.

Specifically, in the present embodiment, after the maintenance personnel enter the name of the data parameter, the preset method corresponding to the parsed data parameter, and the method corresponding to invoked preset method into the system on the visual configuration platform, these will be transmitted to the background server corresponding to the visual configuration platform. The background server will splice the above content, with the name of the data parameter as the object name and an object further constituted by the preset method corresponding to the parsed data parameter and the method parameter corresponding to the invoked preset method as an object value, so as to form an object. The objects of a plurality of data parameters are further spliced to form a JSON object file.

For example, the fire-fighting data contains "time" and "equipment id", and the format of the formed JSON object is:

```
{
    "time":{
        "method": "getTime",
        "args": [
            "<bf>",
            13,
            "YTM"
        ]
    },
    "devid":{
        "method": "getDevId",
        "args": [
            {
                "method": "getByte",
                "args": [
                    "<bf>",
                    10,
                    3
                ]
            }
        ]
    }
}
```

In the above example, the time and the device respectively represent the data parameters of time and device id, the method represents the preset method, the args represents the method parameter corresponding to the preset method, and the <bf> represents the byte array of the fire-fighting data.

Further, in the method parameters of the preset method, the preset method is nested and used as the method parameter in accordance with the rules in the data parsing protocol.

For example, among the data parameters of the above-mentioned device id, the GetByte method is nested as a method parameter of GetDevId to use.

SB4, when acquiring a parameter value corresponding to the data parameter is required in the fire-fighting data, the object value corresponding to the data parameter is acquired in the JSON object, the method parameter is parsed into the preset method by the preset method stored in the object value and the method parameter corresponding to the preset method is invoked, a method body of the preset method in the preset tool base is invoked, and the parameter value corresponding to the data parameter in the fire-fighting data is acquired by processing the fire-fighting data with the preset method.

Specifically, in the present embodiment, when obtaining the parameter value corresponding to the data parameter in the fire-fighting data is required, taking the JSON object corresponding to "time" and "device id" in S3 as an example, when the parameter value of "time" is required to be acquired, through the preset method GetTime stored in the object value, the parameter value of time may be acquired by invoking the method parameter "args": ["<bf>", 13, "YTM"] of GetTime method and transmitting the method into the preset method while invoking the method body of GetTime in the preset tool base.

For example, the byte array of fire-fighting data is hexadecimal byte array, i.e., "FF, FF, FF, 0A, 01, 01, 6E, 01, 13, 00, 01, 01, C8, 14, 14, 03, 1B, 11, 10, 0F, 00, 00, 00, 00, 00, 00, 00, 00, 01, B4". It is stipulated that the 13th to 18th data represent time, which are respectively year, month, day, hour, and minute. The hexadecimal byte array is replaced with <bf> in the JSON object, and the GgetTime method is invoked, so as to obtain the time {"time":"202003271716"}.

The location of <bf> may be written with specific fire-fighting data, or may be represented by a variable; the JSON object is encapsulated into a method, and values are assigned to the variables through the parameters of the method, so that for the same data parsing protocol, configuration has to be only performed once on the visual configuration platform.

The above parsing method has the following advantages:

(1) Through the establishment of the visual protocol parsing method of the fire-fighting IoT data, the above technical solution makes visual JSON customized parsing solution into hardware, and results in JSON type may be obtained for further parsing only by filling in the corresponding meaning of the corresponding data in a visual way according to the requirements in the protocol by the hardware manufacturer, so that developers do not need to parse the data and may directly obtain the JSON result for development. Efficient and rapid development may be realized and complicated development steps are reduced.

(2) By verifying the data parameters before obtaining the parameter values corresponding to the data parameters in the fire-fighting data, the correctness of the fire-fighting data is guaranteed, wherein if there is not correctness, subsequent parsing operations will not be performed.

(3) In the method parameters of the preset method, the preset method is nested and used as the method parameter in accordance with the rules in the data protocol. The above technical methods may solve more complex data parsing protocols, wherein when the data parameters are obtained, a plurality of methods are invoked to parse the data parameters step by step, the processing results of the method body invoked in the previous step are treated as the parameter of the next preset method, which actually nests the processing logic in the entire data parsing protocol in the preset method, and the program will directly and automatically invoke each preset method step by step when the data parameters are obtained, so that there is no need to manually set the invoking sequence of preset methods.

(4) The present invention also introduces the process of parsing the fire-fighting data through data parsing protocol through drools rule engine management, wherein due to drools' own data processing structure, the part that verifies the data parameters is directly written into the rule condition part of the drools rule engine, and the parsing part of the data parameter is written into the rule result part of the drools rule engine, so that when the drools rule engine is used to execute the process of obtaining data parameters, the rule result part of the drools rule engine will be executed only after the rule condition part of the drools rule engine is executed and passed, thereby eliminating manual setting of determination conditions.

(5) Through the visual configuration platform, by setting such as drop-down boxes and fuzzy search methods, the name of the preset method is displayed. The data parsing protocol maintenance personnel does not need to complete the data of the preset method name, which simplifies the work of the maintenance personnel and avoids the input error of the preset method, which may result in the failure of subsequent parsing work.

(2) Routing Step

It mainly solves the problem of how to deal with the data uploaded by various equipment or the same equipment installed in different locations.

According to the requirements of the business, different business processes need to process related device data. For example, the alarm process needs to process the alarm data of all equipment. The routing program determines how the upload data of the equipment needs to be processed according to the settings.

According to requirements of the business, a variety of queues are preset, such as alarm queues, fault queues, and hidden danger queues.

All data will be sent to the routing queue; after the routing processing program receives the data, the routing table of the equipment may be found according to the equipment number, and the corresponding routing queue may be found in the routing table according to the equipment status of the equipment.

Under each order column, a plurality of event handling sub-processes under the queue attribute may be set separately. For example, different alarm processing processes may be set under the alarm queue. The process may be set according to the building or according to a certain type, such as a certain type of marine alarm.

When a data packet is parsed, the type and value, etc. are parsed from the data packet, and then sorted into different queues according to the different queue lists stored in the pre-database, and then further sorted to specific event processes for processing.

(3) Event Processing Step

Event trigger processing including alarms and faults is performed to achieve remote fire-fighting monitoring. The hidden dangers of building fire-fighting are clear at a glance, and APP, platform, SMS, voice call, manual customer service and other methods are used to achieve real-time acquisition of all fire-fighting facility operation information and maintenance unit daily work information. The comprehensive and dynamic supervision and management of the daily operation status of the fire-fighting IoT equipment and facilities of social units may also be realized while realizing the networking of fire-fighting facilities.

(4) Intelligent Maintenance

The event triggering may further include an intelligent maintenance method, which includes the following steps:

SC1, a maintenance platform for maintaining the fire-fighting data is established, the maintenance platform receives fire-fighting basic information including the building and the fire-fighting equipment set on the building, and the maintenance platform stores the fire-fighting basic information into the corresponding fire-fighting database.

Specifically, in the present embodiment, a fire-fighting database that matches the fire protection data should be established first, and a reasonable data storage structure based on the fire-fighting data is established. After the establishment of the fire-fighting database is completed, a corresponding and visualized maintenance platform for the fire-fighting data is established based on the fire-fighting database for the maintenance personnel of the fire-fighting data to enter information including the building and the fire-fighting equipment installed at each location of the building into the fire-fighting database.

The fire database may be established by using any database including Mysql, Oracle, Sqlserver, Sqlite, and PostgreSQL, or may be any kind of open source database, which is a solution that only adjusts the selection of the database belonging to the protection scope of the present invention The maintenance platform of fire-fighting data is preferably to establish a web page; the page is relatively large with strong operability, and the maintenance platform of the fire-fighting data may also be in any form including APP, small program, and public account, which is not limited by the present invention.

Further, the maintenance platform receives fire-fighting basic information including the building and the fire-fighting equipment set on the building, which specifically includes:

a building form corresponding to the building is established in the fire-fighting database, basic information of the building is received through a maintenance platform, and the basic information of the building in the building form is pushed and stored by a method of establishing such as a http interface while setting a field of a building unique identification code in the building form for identifying each building;

a fire-fighting equipment form corresponding to the fire-fighting equipment is established in the fire-fighting database, basic information of the fire-fighting equipment is received through the maintenance platform, and the basic information of the fire-fighting equipment in the fire-fighting equipment form is pushed and stored by a method of establishing such as a http interface while setting a field of the building unique identification code in the fire-fighting equipment form for identifying the building specifically corresponding to the current fire-fighting equipment.

For example, the building (a fire-fighting lab) is registered through to the maintenance platform; the building entry form is filled through the entry page on the maintenance platform, the submit button is clicked after the filling is completed, and then the building information of the fire-fighting lab will be stored in the fire-fighting database through the HTTP interface via the back-end server. Further, after registration of the fire-fighting lab is completed, the corresponding fire-fighting equipment in the fire-fighting lab is required to be registered; taking registration of 3 manual fire alarm buttons as an example, the building of the fire-fighting lab is selected on the corresponding fire-fighting equipment input interface on the maintenance platform, the relevant information of the manual fire alarm button is filled, and the submit button is clicked after the filling is completed, followed by similarly finally storing the fire-fighting equipment information of the 3 manual fire alarm buttons stored in the fire database through the back-end server by the HTTP interface.

In addition, for the building with a relatively large amount of data, as well as data from the fire-fighting equipment, the data may be organized into a data file including excel, csv, xml, then an import button is set on the maintenance platform to import data files containing a large amount of data into the fire-fighting database together, so as to reduce the time for data entry.

SC2, a maintenance rule base is established, and compatible maintenance rules including a maintenance frequency and a maintenance requirement are established according to an equipment type of the fire-fighting equipment, which are stored in the maintenance rule base.

Specifically, in the present embodiment, before maintenance items are established for the fire-fighting equipment, first of all, the corresponding maintenance rules are entered in the maintenance rule database for each type of equipment in each fire-fighting system according to the national laws and regulations and the actual work arrangements of social units.

For example, for the manual alarm button in the fire alarm system, the maintenance frequency is specified as "a manual fire alarm button once a year", and the maintenance requirements are "in addition to testing all during the year, the starting parts are broken, deformed or displaced; after triggering, the fire alarm information is output to the alarm controller, the alarm confirmation light is started, and it can be reset manually". The above rules are entered into the maintenance rule database, and then the above rules are invoked when a maintenance item is established for the manual alarm button.

SC3, a maintenance item database is established, the fire-fighting equipment is acquired in the fire-fighting database, and a corresponding maintenance item is established according to the maintenance rule that is compatible with the equipment type of the fire-fighting equipment for each of the fire-fighting equipment, which is stored in the maintenance item database.

Specifically, for each fire-fighting equipment in the system, when a maintenance plan is formulated, a corresponding maintenance item needs to be established to record the maintenance of fire-fighting equipment. When the maintenance item is established, the establishment has to be completely based on the maintenance rules established in the step S2.

For example, when the maintenance items for the fire alarm system are required to be established in the fire-fighting lab, all the fire-fighting equipment in the fire alarm system corresponding to the fire-fighting lab are obtained through the unique identification code of the building corresponding to the fire-fighting lab, so as to obtain the above registered 3 manual fire alarm buttons. The maintenance rules of the corresponding manual fire alarm button are found through the judgment of the program, the maintenance items corresponding to the manual fire alarm buttons are established according to the maintenance rules, and the status of the maintenance items is set to unmaintained.

SC4, a front-end display platform corresponding to the maintenance item database is established, and the fire-fighting equipment is triggered to perform maintenance according to a maintenance time of the maintenance item displayed on the front-end display platform.

Specifically, in the present embodiment, after all the maintenance items are established, the maintenance personnel need to be notified to start the maintenance, and then a visual front-end display platform is required to be established for the maintenance item database to be shown to the maintenance personnel for maintenance of each fire-fighting equipment according to the maintenance item.

During maintenance, the fire-fighting equipment is triggered directly for maintenance without any operations on the front-end display platform.

SC5, when all the fire-fighting equipment are triggered for maintenance, the fire-fighting equipment pushes the maintenance information to the maintenance item database, and updates the maintenance status of the maintenance item.

Specifically, in the present embodiment, after the fire-fighting equipment is triggered for maintenance, the maintenance personnel do not need to perform any operations on the front-end display platform, and the fire-fighting equipment will automatically push the maintenance information to the maintenance database for updating the maintenance status of the maintenance item.

Further, the pushing, by the fire-fighting equipment, the maintenance information to the maintenance item database specifically includes the following:

the fire-fighting equipment uploads the byte stream data of the maintenance information through gprs;

the parsing layer for parsing is established, and the byte stream data uploaded by the fire-fighting equipment are parsed according to the data parsing protocol corresponding to the byte stream data through the parsing layer;

the routing layer for routing the data is established, and the routing layer routes the parsed maintenance information to the corresponding application layer through technologies including kafka;

the application layer stores the received maintenance information in the maintenance item database.

Also taking the above manual fire alarm button as an example, after the maintenance personnel start the maintenance, they manually trigger a fire alarm button, the manual fire alarm button uploads the byte stream through gprs, the parsing layer receives the byte stream data corresponding to the corresponding data parsing protocol for parsing out information through programs, which is alarm information, and the routing layer sends the parsed data through kafka (sending terminal) technology; then, the application layer (receiving terminal) receives the data and stores in the maintenance item database, updating the maintenance status of the fire-fighting equipment as "maintained" while updating the maintenance progress of the entire new maintenance plan.

Embodiment Two

An intelligent safety management and control method for fire-fighting includes steps of:

S1, a management and control server is established for intelligent safety management and control of fire-fighting, and a multi-level intelligent fire-fighting safety management and control index model is pre-established for the safety management and control of fire-fighting according to single buildings or independent places based on the nature of the unit in advance and the fire-fighting safety management and control index model is saved in the management and control server before the safety management and control of fire-fighting;

S2, the management and control server checks the data collected in real time item by item based on the fire-fighting safety management and control index model through fire-fighting files of the units and data collected in time by the fire-fighting IoT system in the intelligent remote monitoring method for fire-fighting according to the established fire-fighting management and control index model, and manages and controls each individual item in accordance with management and control standards.

Embodiment Three

Figure 4:
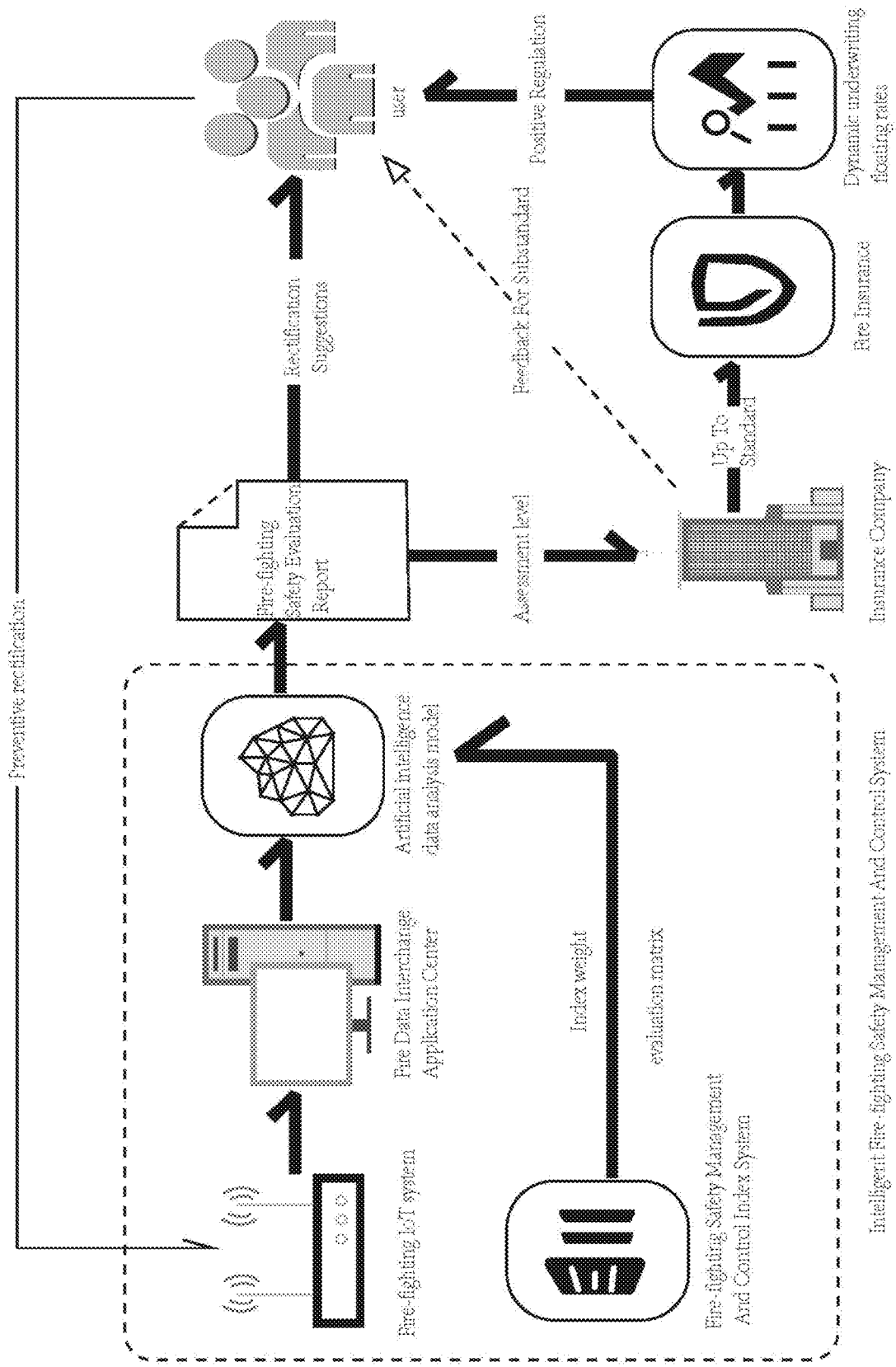
FIG. 4 is a schematic diagram of an interactive working mechanism combining an intelligent fire-fighting safety management and control with a fire insurance of the present invention.

As shown in FIG. 4, a calculation method of fire insurance premium rate based on the intelligent remote monitoring method for fire-fighting includes steps of:

a management and control server is established for intelligent safety management and control of fire-fighting, and a multi-level intelligent fire-fighting safety management and control index model is pre-established for the safety management and control of fire-fighting according to single buildings or independent places based on the nature of the unit in advance before the safety management and control of fire-fighting;

the management and control server checks the data collected in real time item by item based on the fire-fighting safety management and control index model through fire-fighting files of the units and data collected in time by the fire-fighting IoT system in the intelligent remote monitoring method for fire-fighting according to the established fire-fighting safety management and control index model, and manages and controls each individual item in accordance with management and control standards;

the management and control server determines a fire safety level of the controlled unit through a series of processes of weight determination and synthesis calculation, issues corresponding fire-fighting safety assessment management and control reports and rectification suggestions, and outputs the results to an insurance management platform of an insurance company;

the insurance management platform grasps an actual fire safety situation of the underwriting unit, calculates a reasonable rate floating factor, and gives underwriting recommendations according to the fire-fighting safety assessment results.

Figure 3:
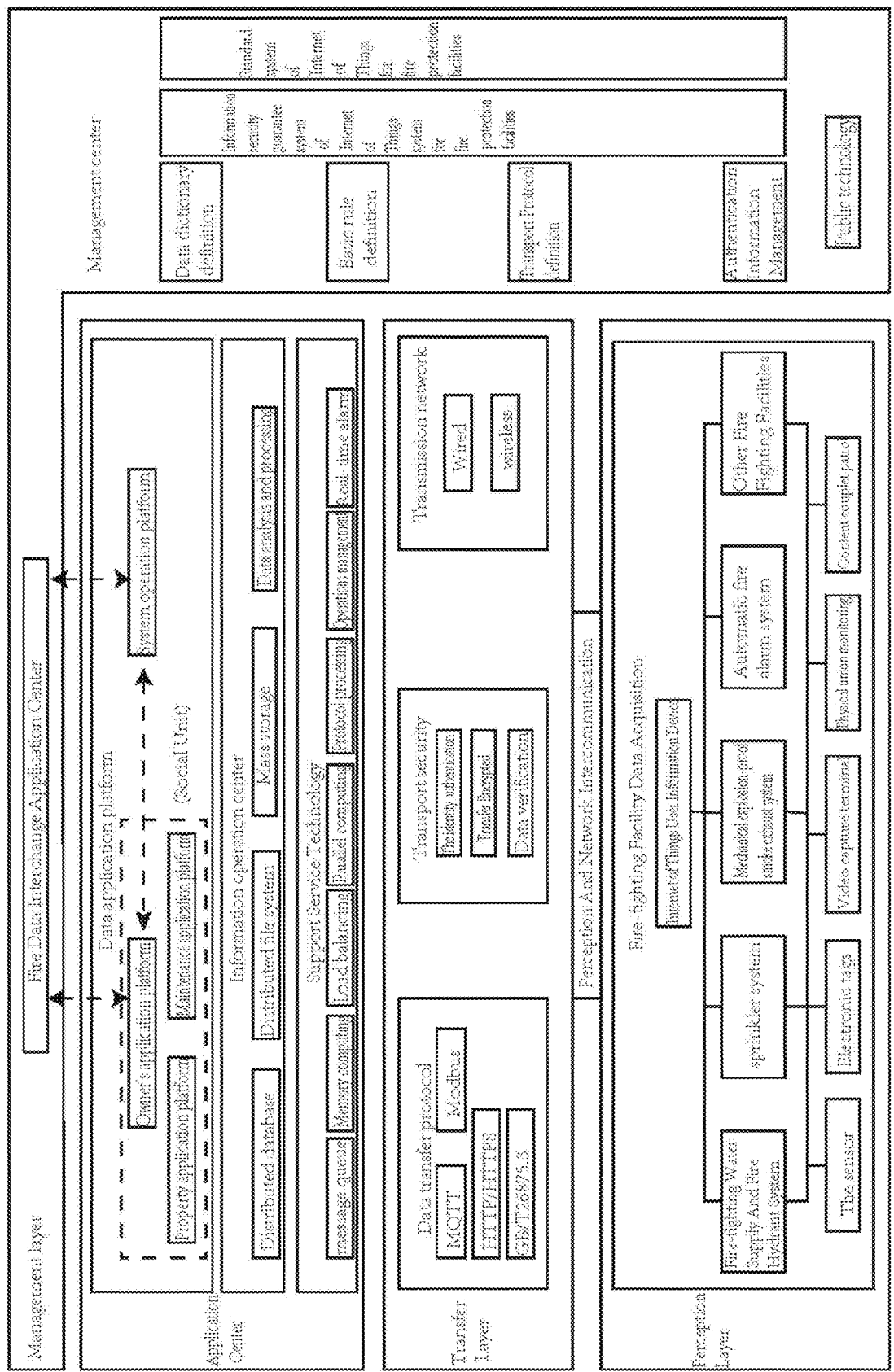
FIG. 3 is a system architecture diagram of a fire-fighting IoT system of the present invention.

With continuous reference to FIG. 3, a fire-fighting IoT system, a fire-fighting data exchange application center, an artificial intelligent data analysis model and a fire-fighting safety management and control index system are included, wherein the fire-fighting data exchange application center receives and calls the fire-fighting data collected in time by the fire-fighting IoT system; the artificial intelligent data analysis model checks management and control indexes item by item through the unit fire-fighting files and the fire-fighting data called by the fire-fighting data exchange application center according to the fire-fighting safety management and control index system, and assesses each individual item in accordance to the assessment standards, and determines the fire-fighting safety level of the assessed unit through a series of processes of weight determination and combined calculations while giving the corresponding fire-fighting safety assessment reports and rectification suggestions.

The intelligent safety management and control method for fire-fighting is a method for calculation and processing of the fire-fighting big data information collected by the fire-fighting IoT system through mathematical models using artificial intelligent methods with the fire-fighting IoT system based on the intelligent fire-fighting safety management and control index model, so as to finally obtain the fire-fighting safety management and control level of the buildings and sites.

During application, the Artificial Intelligence System of Fire Internet of Things (AIOT) monitors and compares whether each fire-fighting facility meets the relevant national and local standards through the intelligent management and control of the fire-fighting facilities of social units to obtain professional analysis results of the operation of fire-fighting facilities, which provides a feasible basis for the implementation of specific work and effectively and timely manages the fire-fighting facilities in the building, so that the risk of fire caused by the paralysis or failure of the facility may be avoided, and the facility is prevented from being punished by the regulatory authority for non-compliance with national regulations. Through the optimization of the fire-fighting management process, the supervision of the property and maintenance personnel has been realized. The AIOT system will cooperate with specific data intelligent analysis modules and linkage models for differentiated application scenarios to achieve the goal of diversified and modular data, making the entire fire-fighting management framework and architecture flexible and intelligent.

As shown in FIG. 2, the fire-fighting IoT system includes a perception layer, a transmitting layer, an application layer and a management layer. The data collection source of the perception layer may be performed by sensors, electronic tags, video collection terminals, IoT monitoring, and IoT inspections. The collected data are uploaded to the IoT user information device provided at the user terminal of the fire-fighting facility IoT, and the communication inspection cycle between other information collection devices and the fire-fighting IoT cloud computing center does not exceed 30 minutes, the information may be sent wiredly or wirelessly, the data is gathered to the fire-fighting IoT cloud computing center, and the IoT monitoring information may be sent to physical entities. The fire-fighting facility systems are collected separately according to different system types and collected to the collection device of the corresponding system. At present, the IoT perception equipment used for information collection of fire-fighting facilities may realize the supervision of automatic fire alarm systems, firefighting water supply and fire hydrant systems, automatic sprinkler systems, smoke prevention and exhaust systems, electrical fire monitoring systems, combustible gas detection and alarm systems, and other fire-fighting facilities. IOT perception equipment may collect point location information, working status information, action feedback signals, alarm signals, maintenance information, safety management information, etc. of fire-fighting facilities and equipment. For example, the water system information device is provided to monitor the manual/automatic control status of the fire-fighting water pump, and the start/stop action status, the fault status, and the power status of the water pump control cabinet; the pressure sensor, liquid level sensor, temperature sensor and other sensors are set to monitor the pressure of the fire-fighting pipe network, the water level of the fire-fighting water supply facility, and the temperature of the water supply pipe network.

After the information collection is completed, according to the transmission protocol, the data enters the transmission layer. The transmission of network data has real-time transmission efficiency and response speed, as well as identity authentication, data security encryption, and security during data transmission. The transmission network may select the optical fiber wired network for transmission, or the wireless transmission using the IoT private network and the mobile cellular network. The data transmission of all transmission layers is encrypted transmission, and the user information transmission device supports automatic switching of multiple links.

After passing through the transport layer, the data enters the application layer. The application layer selects supporting service technology, analyzes and processes the collected data through the fire-fighting IoT cloud computing center, and applies the obtained results to the data. The supporting service technologies include technical means such as message queues, memory computing, parallel computing, operation and maintenance management, and real-time alarms. The fire-fighting IoT cloud computing center selects technical means such as distributed databases, distributed file systems, mass storage, and data analysis and processing to carry out mass storage and analysis of data. The transmission capacity, processing capacity, and storage capacity of the fire-fighting IoT cloud computing center support online expansion, wherein the reliability of data security and storage is not less than 99.99%, the data retention period is not less than 1 year, the storage period of video files is not less than 6 months, and at least one data backup is supported with the backup time less than 24 h. The fire-fighting IoT cloud computing center supports dynamic updates, partial rapid updates and dynamic function expansion, and ensures 24 h daily service availability. The center also provides data access interfaces based on HTTP and HTTPS, supports concurrent access to real-time data of more than 5000 buildings, and supports concurrent accesses of more than 10000 TPS. After receiving fire alarm, shielding, and fault information, the fire-fighting IoT cloud computing center may intelligently analyze and judge the level of fire alarm, shielding, fault shielding, and silence information, and use corresponding methods to push them to relevant personnel in real time; after the fire-fighting linkage information is received, the relevant linkage information may be intelligently analyzed, judged, counted and summarized, and the operation status of the fire-fighting facility may be automatically tested. The data application platform includes a system operation platform, an owner application platform, a property application platform and a maintenance application platform. The system operation platform is responsible for processing information and outputting results to provide background support services for the owner application platform, the property application platform and the maintenance application platform, and exchange information with a fire-fighting data exchange application center. The data application platform may provide ways such as Web, APP, data interface, short message and voice call to query basic information of buildings, basic information of units, basic information of personnel, basic information of fire-fighting facility, counting information of fire-fighting facility, alarm information of fire-fighting facility, linkage information of fire-fighting facility, fault information of fire-fighting facility, shielding information of fire-fighting facility, and IoT monitoring information, maintenance information of fire-fighting facility, inspection information of fire-fighting facility, maintenance information of fire-fighting, activity information of personnel, real-time operation status information of fire-fighting facility IoT equipment. The inquiry and acquisition of the above information is the material basis for the realization of intelligent fire-fighting safety management and control.

In the management layer of the fire-fighting IoT system, the fire-fighting data exchange application center receives and calls information of the owner application platform or the system operation platform in each fire-fighting IoT system for centralized analysis and application of the firefighting data, and pushing relevant fire-fighting information to the owner application platform or the system operation platform. On the basis of studying more than 400 fire-fighting codes and technical standards, the management center has sorted out more than 6000 hazards through professional artificial intelligence learning technology, and establishes a professional fire-fighting safety management and control system including a three-level evaluation index system, wherein the first-level index system includes five parts: building characteristics, state of fire-fighting facilities, inspection of fire-fighting facilities, maintenance of fire-fighting facilities, and fire-fighting safety management of units. Each part contains a plurality of management and control systems as a second-level index system, and each of the management and control systems contains a plurality of impact factors as a third-level index system. The index factors together constitute the safety management and control index system, which comprehensively and systematically reflects the fire safety risk factors of the managed and controlled object (system). According to the established intelligent fire-fighting safety management and control level index impact factor score×third-level index weight); the contribution of the secondary index to the first-level index is calculated as: Σ (the contribution score of the third-level index×the weight of the second-level index); the final score for intelligent safety management and control is calculated as: Σ (second-level index contribution score x first-level index weight), and the calculation processes are shown in Table 4. The IoT platform may automatically generate fire-fighting safety management and control reports, and display the fire-fighting safety level in the form of a hundred-point system, to prompt potential fire hazards and finally form an intelligent fire-fighting safety assessment report, thereby proposing measures and methods to improve the safety situation in a targeted manner. The method for processing data with artificial intelligence is a technical means to realize intelligent fire-fighting safety management and control. Owners, property owners, and other relevant personnel may learn about the results of intelligent building fire-fighting safety management and control and recommendations for fire-fighting measures through the information fed back from the data application platform.

TABLE 4

| First-level Index | Weight | Score | Contribution | Second-level Index | Weight | Score | Contribution | Third-level Index | Weight | Score | Contribution |
|---|---|---|---|---|---|---|---|---|---|---|---|
| Building Characteristic | $V_1$ | ai = Σ(bi × wi) | ai × vi | . . . | wi | bi = Σ (ci × ui) | bi × wi | . . . | ui | ci | ci × ui |
| Facility Status | $V_2$ | | | | | | | | | | |
| Fire-fighting Inspection | $V_3$ | | | | | | | | | | |
| Maintenance | $V_4$ | | | | | | | | | | |
| Fire-fighting Safety Management | $V_5$ | | | | | | | | | | |
| Total Score | | | | | | $\Sigma(a_i \times v_i)$ | | | | | | index system, the risk management and control analysis method is used to determine the weight of the index factors. Then, according to the data information reflecting the status of fire-fighting facilities and equipment, linkage functions, maintenance and inspection conditions and the fire-fighting safety management of units, each evaluation factor is judged. For example, the pressure sensor set on the outlet pipe network of the fire-fighting water pump is used to return the pressure value of the pipe network of the fire-fighting water supply to determine the normal/abnormal status of the fire-fighting water supply system of units for scoring the relevant management and control items; with the fan system information device, when the fan fails or is under manual control, the system will prompt the user to make corrections and score the relevant management and control indexes. Finally, the fire-fighting safety score of the system is calculated by mathematical statistics, and the fire-fighting safety level of the system is finally determined. During the management and control process, with the computer machine learning, all data of the fire-fighting IoT system application platform are extracted, aggregated and reconstructed in accordance with the evaluation system and calculation rules, and artificial intelligence methods are used to achieve intelligent physical examination of building fire-fighting safety status, wherein starting from the third-level index, the contribution to the second-level index is calculated as: Σ (third- The determining a fire safety level of the controlled unit through a series of processes of weight determination and synthesis calculation, and issuing corresponding fire-fighting safety assessment management and control reports and rectification suggestions include the following steps: first step, weight coefficients of the controlled unit are determined.

The management and control activities are ultimately implemented in the scoring of each evaluation item. The evaluation items are divided into three types, wherein the single item of category A scores 10 points, the single item of category B scores 5 points, and the single item scores of category C scores 2 points. The score of any evaluation unit is the sum of the scores of the included evaluation items $R_i$, and the weight $\omega_i$ is the ratio of the score of the evaluation unit to the sum of the scores of all evaluation units, as shown in formula (1), wherein is the number of evaluation units.

$$\omega_i = \frac{R_i}{\sum_{i=1}^{n} R_i} \qquad (1)$$

Second step, a scoring rate of the evaluation unit is calculated.

According to the management and control index system and the fire-fighting data provided by the fire-fighting data exchange application center, individual inspections are scored item by item. Due to the actual situation of the unit, items that are not involved in the unit may not be controlled. The score of each evaluation unit is the ratio of the total score of the actual management and control items to the sum of the actual evaluation individual scores, i.e., the scoring rate of the evaluation unit, as shown in formula (2).

$$\psi_i = \frac{\sum_{j=1}^{m} S_j}{R_i} \times 100\% \quad (2)$$

The m in formula (2) is the number of actual control items included in each control unit. $S_j$ is the actual score of the controlled individual item.

Third step, a final score is calculated.

Taking into account the different impacts of the status of each control unit on fire-fighting safety, different weight coefficients w of the controlled unit are determined (see formula (1) for the calculation formula), and the final score $\psi'$ is obtained:

$$\psi' = \sum_{i=1}^{n} (\psi_i \times \omega_i) \quad (3)$$

Fourth step, a rating level is determined.

A fire-fighting safety level of the object is obtained in accordance to grading standards in Table 5 according to the final scores of the controlled object, and improvement suggestions are proposed.

TABLE 5

| Grading | Standards | Improvement Suggestions |
| --- | --- | --- |
| Very Dangerous | (0, 30] | There is a major fire hazard, the building or site should be stopped immediately and reconstructed or rebuilt. |
| Quite Dangerous | (30, 60] | There are serious fire hazards. If conditions permit, stop production and business, and focus on rectifying the fire hazards; or isolate the dangerous area and immediately rectify the fire hazards. Re-evaluate after the rectification is completed, and put into normal use after the safety status reaches the standard. |
| Relatively Dangerous | (60, 75] | There is a large fire hazard, should be rectified immediately to improve the state of fire-fighting facilities, ensure unblocked evacuation facilities, and strengthen the maintenance of fire-fighting facilities and fire safety management. |
| Relatively Safe | (75, 90] | There are general fire hazards, fire safety management and control should be strengthened, and the hidden hazards with greater impact should be corrected to ensure that the fire-fighting facilities are intact and effective. |
| Safe | (90, 100] | There are fewer fire hazards, fire-fighting facilities should be kept intact, fire-fighting safety training and education and emergency drills should be strengthened, and fire-fighting management should be continuously improved. |

Fifth step, all the problematic items are listed according to the checking results, provisions of the corresponding fire-fighting regulations and technical standards are provided, and rectification methods and measures are provided.

For example, a shopping mall building with a fire-fighting IoT system is subjected an intelligent examination. According to the evaluation index system and the actual situation, based on the information returned by the fire-fighting data exchange application center, the individual inspections are scored item by item. The final score is 73 points. Taking the fire-fighting facility status unit as an example, the score calculation process is as follows:

First step is that weight coefficients of the unit are calculated. The total scores of four units of intelligent examination are 120, 300, 265 and 180, respectively. Therefore, weight coefficients of these units are $$\omega_1 = \frac{120}{120 + 300 + 265 + 180} = 0.14,$$

$\omega_2 \approx 0.35$, $\omega_3 \approx 0.30$, and $\omega_4 \approx 0.21$, respectively.

Second step is that the scoring rate of each unit is calculated. Taking the fire-fighting safety management unit as an example, with combination of the building, individual items do not exist, as shown in Table 6:

TABLE 6

| Evaluation | Sub-item | Evaluation Individual Item | Score Values | Inspection | Score |
|---|---|---|---|---|---|
| Fire-fighting Safety Management Unit | Inspection Management | Automatic Fire Alarm System | 10 | Partially Unqualified | 5 |
| | | Water Source Management | 10 | Qualified | 10 |
| | | Fire-fighting Water Pumps And Pressure Stabilizing Facilities | 15 | Partially Unqualified | 10 |
| | | Outdoor Fire Hydrant | 5 | Qualified | 5 |
| | | Water Pump Adapter | 5 | Unqualified | 0 |
| | | Automatic Sprinkler System | 10 | Partially Unqualified | 5 |
| | | Fire Extinguisher | 10 | Partially Unqualified | 5 |
| | Fire Check | Fire Check Per Season/Month (rules as below) | 30 | Partially Unqualified | 20 |
| | | Fire Check Per Day (rules as below) | 40 | Partially Unqualified | 20 |
| | Fire-fighting File | Fire Safety Responsibility System | 10 | Qualified | 10 |
| | | Personnel Qualification Management | 10 | Partially Unqualified | 5 |
| | | Fire-fighting Safety Management And Implementation | 10 | Partially Unqualified | 5 |
| | | Full-time Fire-fighting Team Construction | 10 | Qualified | 10 |
| | Others | Oil Fume Pipe Cleaning | 5 | Unqualified | 0 |
| | Total | | 180 | | 110 |

Taking the determination of the evaluation individual item of fire extinguisher as an example, the pressure status of the fire extinguisher bottle may be collected through the pressure sensor set on the fire extinguisher, and the inspection status of the fire extinguisher of the unit may be checked through the setting of electronic tags to determine whether the fire extinguisher is in good condition and whether it is in compliance with the requirements, so as to further determine that some fire extinguishers are not up to standard; therefore, the individual item is determined as partially unqualified, and the score is 5 points. Finally, the scoring rate of the fire-fighting safety management unit is $$\psi_4 = \frac{110}{180} \times 100\% \approx 61.$$

And so forth, the scoring rates of the other three units are respectively as follows:
basic information is $$\psi_1 = \frac{108}{120} \times 100\% \approx 90;$$

facility status is $$\psi_2 = \frac{235}{300} \times 100\% \approx 78;$$

facility maintenance is $$\psi_3 = \frac{175}{265} \times 100\% \approx 66.$$

Third step is that the weight of each unit is considered and the final score of the building is calculated as follow:

$\psi'=90\times0.14+78\times0.35+66\times0.30+61\times0.21\approx73$

Fourth step is that according to the comprehensive score of the building, the fire-fighting safety level of the building is determined to be relatively dangerous. For instance, there is a large fire hazard, rectification should be done immediately to improve the state of fire-fighting facilities, unblocked evacuation facilities should be guaranteed, and the maintenance of fire-fighting facilities and fire-fighting safety management should be strengthened.

Fifth step is that according to the inspection situation of each unit, the existing problems are summarized and the hidden fire hazards are rectified.

The insurance company grasps an actual fire safety situation of the underwriting unit, gives a reasonable rate floating factor, and proposes underwriting recommendations according to the fire-fighting safety management and control results, with the following specific steps:

(1) the fire risk of the above buildings or sites is undertaken if the intelligent fire safety assessment of the building or independent site is in a first level, which indicates that the insured company has a low fire risk and the state of fire-fighting facilities and safety management are relatively good, and a basic rate is determined according to industry data, wherein when the intelligent security assessment of the insured company is lower than the level one, the insurance company has the right to terminate the insurance contract;

(2) insurance of the above building or site is refused if the intelligent fire-fighting safety assessment of the building or site is in the second level, which indicates that the insured enterprise has a greater fire risk, the insured company violates the fire-fighting laws and regulations and fire technical standards, the fire risk exceeds an expected tolerable level, and the fire-fighting facilities and equipment and the level of safety management are poor; according to the rectification measures proposed by the intelligent assessment, the insured enterprise shall carry out the rectification of the hidden fire hazard of the enterprise, and after the safety assessment score reaches the first level, the previous content shall be implemented;

(3) before the start of the next insurance implementation year, the fire risk level and development trend of the building or site may be analyzed in the previous implementation year based on the fire-fighting safety assessment data of the underwriting unit to determine the fire insurance premium rate for the next year and implement a floating rate, so as to determine the fire insurance cost based on the actual situation of the underwriting unit.

In summary, collecting the information by the fire-fighting IoT system has the characteristics of real-time and fast data update speed, which may effectively control the transient changes of the fire-fighting safety status of the building, and provides early warning and rectification of hidden fire hazards in time; therefore, the intelligent fire-fighting safety management and control based on the IoT system is effective in real time, wherein the results of management and control are more reliable, and information and data may be traced. The intelligent fire-fighting safety management and control is integrated with the fire insurance, and a bridge is built between enterprise fire-fighting investment and economic benefit output, so that the enthusiasm of enterprises is fully mobilized to strengthen the construction and management of fire-fighting safety through actual benefits, and enterprises may be indeed helped to implement the main responsibility of fire-fighting safety; the working mechanism of intelligent fire-fighting safety management and control combined with fire insurance may break through the barriers between the two industries of fire-fighting and insurance, establish a fire risk management and control work model for the entire life cycle of the insurance industry before, during and after the event, really play an important role in fire insurance and disaster prevention and loss reduction, and also lay the foundation for the vigorous development of the insurance industry.

What is mentioned above is only the specific implementation of the present invention, but does not limit the protection scope of the present invention, and anyone skilled in the art may easily think of modifications and alternations within the technical scope disclosed by the present invention, all of which should be contained within the protection scope of the present invention. Therefore, the scope of the present invention should be determined by the scope of the claims

What is claimed is:

1. An intelligent remote monitoring method for fire-fighting, comprising:

pre-loading, by a remote transmission device, a configuration file in a JSON format, the configuration file being configured to describe a binary protocol of a fire-fighting IoT (Internet of Things) equipment of a single building or an independent site;

acquiring, by the remote transmission device, fire-fighting status information and operation status information of the fire-fighting IoT equipment to obtain a data frame of the binary protocol;

parsing, by a fire-fighting IoT cloud computing center, the data frame of the binary protocol according to the configuration file to obtain a JSON object, pushing the parsed data of the fire-fighting IoT equipment to a routing layer of the fire-fighting IoT cloud computing center through data push technology including kafka technology, and storing in a fire-fighting database; and presetting different application modules according to different application services, determining a routing direction of the data of the fire-fighting IoT equipment according to rules including a device type and a device status, and routing corresponding fire-fighting IoT equipment data to the corresponding application module of the different application modules through the routing layer for triggering processing of events including alarms and faults, so as to realize remote monitoring of fire-fighting;

wherein the step of parsing, by the fire-fighting IoT cloud computing center, the data frame of the binary protocol according to the configuration file to obtain the JSON object further comprises:

pre-establishing a preset tool base corresponding to a data parsing protocol parsing fire-fighting data transmitted in a fire-fighting IoT, and storing a preset method applied in the data parsing protocol in the preset tool base, establishing a visual configuration platform for entering the data parsing protocol including a data parameter name corresponding to a data parameter in the data parsing protocol, parsing out the preset method required for the data parameter and invoking protocol parsing information including a method parameter corresponding to the preset method through the visual configuration platform, and sending the protocol parsing information to a background server, splicing, by the background server, the data parsing protocol into a JSON object, with the data parameter name as an object name of the data parameter including the preset method required for parsing the data parameter and invoking the protocol parsing information including the method parameter corresponding to the preset method as an object value of the data parameter, and acquiring a parameter value corresponding to the data parameter in the fire-fighting data, acquiring an object value corresponding to the data parameter in the JSON object, passing the method parameter into the preset method by the preset method stored in the object value and invoking the method parameter corresponding to the preset method, invoking a method body of the preset method in the preset tool base, and acquiring the parameter value corresponding to the data parameter in the fire-fighting data by processing the fire-fighting data with the preset method.

2. The method according to claim 1, further comprising maintenance processing, which further comprises:
pre-establishing a building form corresponding to the building in the fire-fighting database, receiving basic information of the building through a maintenance platform, and pushing and storing the basic information of the building in the building form by a method of establishing an http interface while setting a field of a building unique identification code in the building form for identifying each building;
pre-establishing a fire-fighting IoT equipment form corresponding to the fire-fighting IoT equipment in the fire-fighting database, receiving basic information of the fire-fighting IoT equipment through the platform, and pushing and storing the basic information of the fire-fighting IoT equipment in the fire-fighting IoT equipment form by a method of establishing such as a http interface while setting a field of the building unique identification code in the fire-fighting IoT equipment form for identifying the building specifically corresponding to the current fire-fighting IoT equipment;
pre-establishing a maintenance rule base, establishing compatible maintenance rules comprising a maintenance frequency and a maintenance requirement according to an equipment type of the fire-fighting IoT equipment, and storing in the maintenance rule base;
pre-establishing a maintenance item database, acquiring the fire-fighting IoT equipment in the fire-fighting database, establishing a corresponding maintenance item according to the maintenance rule that is compatible with the equipment type of the fire-fighting IoT equipment for each of the fire-fighting IoT equipment, and storing in the maintenance item database;
pre-establishing a front-end display platform corresponding to the maintenance item database, and triggering the fire-fighting IoT equipment to perform maintenance according to a maintenance time of the maintenance item displayed on the front-end display platform;
further comprising, when the event triggering is a fault event triggering, triggering maintenance events, which comprises pushing maintenance information where a piece of faulty fire-fighting equipment is detected to the maintenance item database and updating a maintenance status of the maintenance item to realize maintenance operations.

3. The method according to claim 2, further comprising:
deploying an application service on a server corresponding to a fire-fighting project by packaging the application module required by the current fire-fighting project into one application service when deploying the fire-fighting project.

4. The method according to claim 2, wherein
the acquiring, by the remote transmission device, fire-fighting status information and operation status information of the fire-fighting IoT-equipment to encode according to the configuration file further comprises:
the text data comprising at least a data unit identifier including a processing type identifier of the fire-fighting IoT equipment and the number of information objects and a plurality of information objects of the same type, each of the information objects containing an information body and a processing time point, the data frame simultaneously transmitting current data of at least one fire-fighting IoT equipment comprising a status, an analog quantity, a configuration, and a corresponding user operation; when the processing type of the fire-fighting IoT equipment is status upload, the information body of each of the information objects containing at least one data comprising a delay, a feedback, a start-up, a supervision, a shielding, a fault, a current status data and a current real-time data where the fire-fighting IoT equipment is located;
the parsing, by a fire-fighting IoT cloud computing center, the data frame according to the configuration file to obtain a JSON object further comprises:
parsing, by the data frame of the binary protocol, the data frame to obtain the JSON object according to the configuration file, simultaneously obtaining and storing in the database a field current value corresponding to these information objects through a compatible JSON object template, and presetting the JSON object template for each processing type of the fire-fighting IoT equipment for describe the plurality of fields that make up the JSON object template and an arrangement order between the plurality of fields;
obtaining the status data from the JSON object, and putting the information object information where the status data is located into a compatible MQ message queue or the fire database for post-processing according to the state data.

5. The method according to claim 1, further comprising:
deploying an application service on a server corresponding to a fire-fighting project by packaging the application module required by the current fire-fighting project into one application service when deploying the fire-fighting project.

6. The method according to claim 1, wherein
the acquiring, by the remote transmission device, fire-fighting status information and operation status information of the fire-fighting IoT equipment to encode according to the configuration file further comprises:
the text data comprising at least a data unit identifier such as a processing type identifier of the fire-fighting IoT equipment and the number of information objects and a plurality of information objects of the same type, each of the information objects containing an information body and a processing time point, the data frame simultaneously transmitting current data of at least one fire-fighting IoT equipment comprising a status, an analog quantity, a configuration, and a corresponding user operation; when the processing type of the fire-fighting IoT equipment is status upload, the information body of each of the information objects containing at least one data comprising a delay, a feedback, a start-up, a supervision, a shielding, a fault, a current status data and a current real-time data where the fire-fighting IoT equipment is located;
the parsing, by a fire-fighting IoT cloud computing center, the data frame according to the configuration file to obtain a JSON object further comprises:
parsing, by the data frame of the binary protocol, the data frame to obtain the JSON object according to the configuration file, simultaneously obtaining and storing in the database a field current value corresponding to these information objects through a compatible JSON object template, and presetting the JSON object template for each processing type of the fire-fighting IoT equipment for describe the plurality of fields that make up the JSON object template and an arrangement order between the plurality of fields;

obtaining the status data from the JSON object, and putting the information object information where the status data is located into a compatible MQ message queue or the fire database for post-processing according to the state data.

7. An intelligent remote monitoring system, comprising: a computing processor, a fire-fighting IoT cloud computing center, and a remote transmission device, wherein:
the remote transmission device is arranged on a fire-fighting IoT equipment terminal or at a location of a fire-fighting IoT system gateway that contains a plurality of fire-fighting IoT equipment for pre-loading a configuration file in JSON format, the configuration file being configured to describe a binary protocol of the fire-fighting IoT equipment of a single building or an independent site, and for acquiring fire-fighting status information and operation status information of the fire-fighting IoT equipment according to the configuration file to encode the text data to be sent to the fire-fighting IoT cloud computing center to obtain the data frame of the binary protocol;
the fire-fighting IoT cloud computing center at least comprises at least one fire-fighting database and a cloud platform, wherein the cloud platform further comprises:
a computing processor;
a parsing layer, configured to parse the data frame according to the configuration file to obtain a JSON object, push the parsed data of the fire-fighting IoT equipment to a routing layer of the fire-fighting IoT cloud computing center through data push technology including kafka technology, and store in a fire-fighting database;
a route layer, configured to preset different application modules according to different application services, and determine a routing direction of the fire-fighting IoT equipment data according to rules including a device type and a device status, and route corresponding fire-fighting IoT equipment data to the corresponding application module of the different application modules through the routing layer;
a processing layer, configured to preset a plurality of queues, each of the plurality of queues being configured with a plurality of event trigger processing processes, for finding the corresponding event trigger processing including alarms and faults to realize remote fire monitoring after receiving a certain corresponding queue routed;
wherein the parsing layer is further configured to:
pre-establish a preset tool base corresponding to a data parsing protocol parsing fire-fighting data transmitted in a fire-fighting IoT, and storing a preset method applied in the data parsing protocol in the preset tool base,
establish a visual configuration platform for entering the data parsing protocol including a data parameter name corresponding to a data parameter in the data parsing protocol, parsing out the preset method required for the data parameter and invoking protocol parsing information including a method parameter corresponding to the preset method through the visual configuration platform, and sending the protocol parsing information to a background server,
splice, by the background server, the data parsing protocol into a JSON object, with the data parameter name as an object name of the data parameter including the preset method required for parsing the data parameter and invoking the protocol parsing information including the method parameter corresponding to the preset method as an object value of the data parameter, and
acquire a parameter value corresponding to the data parameter in the fire-fighting data, acquiring an object value corresponding to the data parameter in the JSON object, passing the method parameter into the preset method by the preset method stored in the object value and invoking the method parameter corresponding to the preset method, invoking a method body of the preset method in the preset tool base, and acquiring the parameter value corresponding to the data parameter in the fire-fighting data by processing the fire-fighting data with the preset method.

8. The system according to claim 7, wherein the cloud platform further comprises a maintenance processing layer, which further comprises:
pre-establishing a building form corresponding to the building in the fire-fighting database, receiving basic information of the building through a maintenance platform, and pushing and storing the basic information of the building in the building form by a method of establishing such as a http interface while setting a field of a building unique identification code in the building form for identifying each building;
pre-establishing a fire-fighting equipment form corresponding to the fire-fighting equipment in the fire-fighting database, receiving basic information of the fire-fighting equipment through the platform, and pushing and storing the basic information of the fire-fighting equipment in the fire-fighting equipment form by a method of establishing such as a http interface while setting a field of the building unique identification code in the fire-fighting equipment form for identifying the building specifically corresponding to the current fire-fighting equipment;
pre-establishing a maintenance rule base, establishing compatible maintenance rules comprising a maintenance frequency and a maintenance requirement according to an equipment type of the fire-fighting equipment, and storing in the maintenance rule base;
pre-establishing a maintenance item database, acquiring the fire-fighting equipment in the fire-fighting database, establishing a corresponding maintenance item according to the maintenance rule that is compatible with the equipment type of the fire-fighting equipment for each of the fire-fighting equipment, and storing in the maintenance item database;
pre-establishing a front-end display platform corresponding to the maintenance item database, and triggering the fire-fighting equipment to perform maintenance according to a maintenance time of the maintenance item displayed on the front-end display platform;
a maintenance processing layer, configured to, when the event triggering is a fault event triggering, trigger maintenance events through the maintenance processing layer, which comprises pushing maintenance information where a piece of faulty fire-fighting equipment is detected to the maintenance item database and updating a maintenance status of the maintenance item to realize maintenance operations.

* * * * *